United States Patent
Ogura et al.

[11] Patent Number: 6,025,297
[45] Date of Patent: Feb. 15, 2000

[54] CATALYST FOR PURIFYING EXHAUST GAS AND PROCESS FOR PRODUCING THE SAME

[75] Inventors: Yoshitsugu Ogura, Toyota; Takeru Yoshida, Susono, both of Japan

[73] Assignee: Toyota Jidosha Kabushiki Kaisha, Toyota, Japan

[21] Appl. No.: 08/969,044

[22] Filed: Nov. 12, 1997

[30] Foreign Application Priority Data

| Nov. 14, 1996 | [JP] | Japan | 8-303182 |
| Jan. 17, 1997 | [JP] | Japan | 9-006572 |
| Oct. 9, 1997 | [JP] | Japan | 9-277649 |
| Oct. 14, 1997 | [JP] | Japan | 9-280195 |

[51] Int. Cl.$^7$ .............. B01J 23/00; B01J 23/38; B01J 23/40; B01J 23/42
[52] U.S. Cl. .............. 502/300; 502/325; 502/326; 502/327; 502/328; 502/330; 502/332; 502/333; 502/334; 502/339; 502/340; 502/341; 502/344; 502/347; 502/348; 502/527.15; 502/527.24; 428/357; 428/402; 428/403; 428/404; 428/446; 428/448; 428/688; 428/689; 428/699; 428/701; 428/702
[58] Field of Search ............... 428/357, 402, 428/403, 404, 446, 448, 688, 689, 699, 701, 702; 502/300, 325, 326, 327, 328, 330, 332, 333, 334, 339, 340, 341, 344, 347, 348, 527.15, 527.24

[56] References Cited

FOREIGN PATENT DOCUMENTS

| B2-2-33644 | 7/1990 | Japan . |
| 3-72945 | 3/1991 | Japan . |
| B2-4-17910 | 3/1992 | Japan . |
| 4-122441 | 4/1992 | Japan . |
| 4-298236 | 10/1992 | Japan . |
| 5-168860 | 7/1993 | Japan . |
| 5-317652 | 12/1993 | Japan . |
| 6-31139 | 2/1994 | Japan . |
| B2-6-28730 | 4/1994 | Japan . |
| 7-24316 | 1/1995 | Japan . |
| 7-75735 | 3/1995 | Japan . |
| 8-99034 | 4/1996 | Japan . |

*Primary Examiner*—Elizabeth D. Wood
*Attorney, Agent, or Firm*—Oliff & Berridge, PLC

[57] ABSTRACT

A catalyst for purifying an exhaust gas includes a core, and a catalyst ingredient loading layer. The core includes a first support, and an $NO_x$ storage member involved in the first support. The catalyst ingredient loading layer includes a second support and a noble metal catalyst ingredient involved in the second support, and is formed on the core. The catalyst ingredient loading layer keeps $SO_x$, included in the exhaust gas, from reaching the core. Hence, the $NO_x$ storage member is inhibited from being poisoned by sulfur. The $NO_x$ storage member is separated from the noble metal catalyst ingredient. Therefore, the noble metal catalyst ingredient is inhibited from sintering.

28 Claims, 2 Drawing Sheets

CATALYST FOR PURIFYING EXHAUST GAS AND PROCESS FOR PRODUCING THE SAME

BACKGROUND OF THE INVENTION

1. Field of the Invention

The present invention relates to a catalyst for purifying an exhaust gas emitted from an internal combustion engine of an automobile, etc., and a process for producing the same. Specifically, it relates to an $NO_x$-storage-and-reduction type catalyst which is optimum for purifying nitrogen oxides ($NO_x$), included in an exhaust gas emitted from a so-called "lean-burn engine", and a process for producing the same.

2. Description of the Related Art

As a catalyst for purifying an automotive exhaust gas, there has been employed a 3-way catalyst so far which oxidizes CO and hydrocarbons (hereinafter referred to as "HC") and simultaneously reduces $NO_x$. For example, the 3-way catalyst has been known widely which comprises a heat-resistant substrate formed of cordierite, or the like, a porous catalyst carrier layer formed of γ-alumina, or the like, and formed on the substrate, and a noble metal catalyst ingredient selected from the group consisting of platinum (Pt), palladium (Pd), rhodium (Rh), and the like, and loaded on the porous catalyst carrier layer.

From the viewpoint of the global environment protection, carbon dioxide ($CO_2$), which is emitted from internal combustion engines of automobiles, and so on, is at issue. In order to reduce the carbon dioxide, so-called lean-burn engines are regarded promising. In lean-burn engines, the air-fuel mixture is lean-burned in an oxygen-rich atmosphere (or a fuel-lean atmosphere). The fuel consumption can be reduced because lean-burn engines consume the fuel less. Accordingly, the carbon dioxide, which is emitted from lean-burn engines as one of the burned exhaust gases, can be inhibited from generating.

The conventional 3-way catalysts oxidize CO and HC, and simultaneously reduce $NO_x$ to purify them. The CO, HC and $NO_x$ are produced by burning an air-fuel mixture whose air-fuel ratio is controlled at the theoretical air-fuel ratio (i.e., the stoichiometric point). Consequently, the conventional 3-way catalysts do not have enough activity to remove $NO_x$, which results from the exhaust gases produced by burning the fuel-lean air-fuel mixture, by reduction in an oxygen-rich atmosphere (or in a fuel-lean atmosphere). Thus, it has been desired to successfully develop an automotive exhaust catalyst and a purifying system which can effectively purify $NO_x$ in an oxygen-rich atmosphere (or in a fuel-lean atmosphere).

Therefore, a system has been developed for lean-burn engines in order to reduce and purify $NO_x$ emitted therefrom. In the system, HC and CO are usually burned in a fuel-lean atmosphere (or an oxygen-rich atmosphere) involving oxygen excessively, and simultaneously $NO_x$ is stored. Accordingly, the exhaust gas is turned into a reducing atmosphere by establishing the stoichiometric point or a fuel-rich atmosphere (or an oxygen-lean atmosphere) temporarily. Thus, $NO_x$ can be reduced and purified. Then, an $NO_x$-storage-and-reduction tape exhaust gas purifying catalyst has been developed which is appropriate for the system. The $NO_x$-storage-and-reduction type exhaust gas purifying catalyst employs an $NO_x$ storage member which stores $NO_x$ in a fuel-lean atmosphere (or in an oxygen-rich atmosphere) and releases the stored $NO_x$ at the stoichiometric point or in a fuel-rich atmosphere (or in an oxygen-lean atmosphere).

For example, Japanese Unexamined Patent Publication (KOKAI) No. 5-317,652 proposes a catalyst for purifying an exhaust gas in which an alkaline-earth metal, such as barium (Ba), and Pt are loaded on a porous support, like alumina, etc. Japanese Unexamined Patent Publication (KOKAI) No. 6-31,139 proposes a catalyst for purifying an exhaust gas in which an alkali metal, such as potassium (K), and Pt are loaded on a porous support, like alumina, etc. Japanese Unexamined Patent Publication (KOKAI) No. 5-168,860 proposes a catalyst for purifying an exhaust gas in which a rare earth element, such as lanthanum (La), and Pt are loaded on a porous support, like alumina, etc.

When the aforementioned system employs these catalysts and the air-fuel ratio is controlled from a fuel-lean atmosphere (or an oxygen-rich atmosphere) to the stoichiometric point or a fuel-rich atmosphere (or an oxygen-lean atmosphere) in a pulsating manner, the $NO_x$ is stored in the alkali metal, alkaline-earth metal and rare earth element in an fuel-lean atmosphere (or an oxygen-rich atmosphere), and the stored $NO_x$ is then released at the stoichiometric point or in a fuel-rich atmosphere (or in an oxygen-lean atmosphere). The released $NO_x$ reacts with the reducing components, such as HC and CO, to be purified. Thus, the catalysts can efficiently purify $NO_x$, included even in the exhaust gases emitted from the lean-burn engines. The alkali metal, alkaline-earth metal and rare earth element, which exhibit the action of storing and releasing $NO_x$, are collectively referred to as an "$NO_x$ storage member". The application of the $NO_x$ storage member is now under way actively.

In the exhaust gas purifying catalysts, the reaction of purifying $NO_x$ was discovered to comprise the following 3 steps:

a first step of oxidizing NO to $NO_x$ in a fuel-lean atmosphere (or an oxygen-rich atmosphere);

a second step of storing the resulting $NO_x$ on the $NO_x$ storage member; and a third step of releasing the stored $NO_x$ from the $NO_x$ storage member and reducing the released $NO_x$ on the catalysts at the stoichiometric point or in a fuel-rich atmosphere (or in an oxygen-lean atmosphere).

In order to smoothly propagate the first and second steps, it was further discovered that the noble metal catalyst ingredient, such as Pt, and the $NO_x$ storage member are disposed as near as possible with each other. Hence, in the aforementioned exhaust gas purifying catalysts, the noble metal catalyst ingredient and the $NO_x$ storage member are loaded on the porous support, such alumina, etc., in a coexisting manner.

The fuels, however, include the sulfur components in a trace amount. The sulfur components are oxidized to generate $SO_x$ when the fuels are burned, or are oxidized on the catalyst to generate $SO_x$. Since $SO_x$ is acidic, there arises the following phenomenon in the $NO_x$-storage-and-reduction type catalyst: the resulting $SO_x$ reacts with the alkaline $NO_x$ storage member to generate sulfites. As a result, the $NO_x$ storing capability of the $NO_x$ storage member is lost to deteriorate the $NO_x$ purifying performance of the $NO_x$-storage-and-reduction type catalyst. The disadvantageous phenomenon is called as the "sulfur poisoning of the $NO_x$ storage member".

The $NO_x$ storage member reacts with $NO_x$ to produce nitrates. However, in the presence of $SO_x$, the $NO_x$ storage member exhibits a property: namely; it is more likely to produce the sulfites than the nitrates. Moreover, when the sulfites are once produced, they are less likely to decompose under ordinary engine operating conditions. Consequently, the $NO_x$ storing capability of the $NO_x$ storage member is less likely to revive. Thus, the $NO_x$ storage member loses the $NO_x$ adsorbing capability gradually by the sulfur poisoning. As a result, the $NO_x$ conversion exhibited by the $NO_x$-storage-and-reduction type catalyst may be decreased sharply after the $NO_x$-storage-and-reduction type catalyst is subjected to a durability test.

In order to overcome the drawback, an apparatus has been proposed. In the apparatus, a catalyst capable of storing $SO_x$ is disposed on an upstream side of an exhaust gas passage of a lean-burn engine, and an $NO_x$-storage-and-reduction type catalyst is disposed on a downstream side of the exhaust gas passage. According to the proposed apparatus, $SO_x$, included in the exhaust gas, is stored in the upstream-side catalyst in a fuel-lean atmosphere (or an oxygen-rich atmosphere). Thus, the downstream-side catalyst is inhibited from being poisoned by sulfur. Moreover, at the stoichiometric point or in a fuel-rich atmosphere (or an oxygen-lean atmosphere), the stored $SO_x$ is released from the upstream-side catalyst, and the stored $NO_x$ is released from the downstream-side catalyst. Thus, the released $SO_x$ and $NO_x$ are reduced and purified by the HC and CO included in the exhaust gas.

The recent survey, however, has revealed that the reaction of $NO_x$ storage member with $SO_x$ takes place not only in a fuel-lean atmosphere (or an oxygen-rich atmosphere), but also in a fuel-rich atmosphere (or an oxygen-lean atmosphere). Hence, in the proposed apparatus having the aforementioned catalyst arrangement, the stored $SO_x$ is released from the upstream-side catalyst in a fuel-rich atmosphere (or an oxygen-lean atmosphere), and is eventually reacted with the $NO_x$ storage member of the downstream-side catalyst even in a fuel-rich atmosphere (or an oxygen-lean atmosphere). Thus, there arise the problems associated with the sulfur poisoning of the $NO_x$ storage member.

In addition, in the conventional exhaust gas purifying catalysts, Pt is subjected to the granular growth (or sintering) in a fuel-lean atmosphere (or an oxygen-rich atmosphere). Accordingly, there arises a drawback in that the active cites of the catalysts are decreased so that the reactivities are decreased in the above-described first and third steps of the $NO_x$ purifying reaction. As a result, when the conventional catalysts are used at elevated temperatures, the conventional catalysts suffer from the decreased $NO_x$ purifying and durability.

In this instance, Japanese Unexamined Patent Publication (KOKAI) No. 4-122,441 discloses an engineering technique for inhibiting Pt from sintering. According to the publication, the sintering of Pt, which results from the granular growth of alumina, is prohibited by employing alumina which is subjected to a heat treatment in advance. It was discovered, however, that not only the sintering of Pt is resulted from the granular growth of alumina, but also it is further facilitated when the $NO_x$ storage member and Pt are disposed in proximity to each other. In addition, there arises another problem in that the $NO_x$ storage reaction of the second step and the $NO_x$ reduction reaction of the third step are less likely to occur when the $NO_x$ storage member and Pt are separated away from each other by a large distance. If such is the case, the $NO_x$ purifying performance of the $NO_x$-storage-and-reduction type catalyst is deteriorated eventually.

SUMMARY OF THE INVENTION

The present invention has been developed in view of the aforementioned circumstances. It is an object of the present invention to provide an $NO_x$-storage-and-reduction type catalyst for purifying an exhaust gas, in which the $NO_x$ storage member is furthermore inhibited from the sulfur poisoning, and whose durability is furthermore improved by appropriately disposing the noble metal catalyst ingredient, such as Pt, and the $NO_x$ storage member so as to prohibit the noble metal catalyst ingredient from sintering.

In a first aspect of the present invention, a catalyst for purifying an exhaust gas comprises:

a core including a first support and an $NO_x$ storage member involved in the first support; and a catalyst ingredient loading layer including a second support and a noble metal catalyst ingredient involved in the second support, and formed on the core.

In the first aspect of the present invention, a composition ratio of the core with respect to the catalyst ingredient loading layer can fall in a range of from 1:2 to 8:1 by weight.

In the first aspect of the present invention, the $NO_x$ storage member can be at least one element selected from the group consisting of alkali metals and alkaline-earth metals.

In the first aspect of the present invention, the second support can be a metallic oxide including alumina at least.

In the first aspect of the present invention, the first support can include a composite oxide composed of alumina ($Al_2O_3$) and titania ($TiO_2$); and a composition ratio of $TiO_2$ with respect to $Al_2O_3$ can fall in a range of from 1:2 to 1:9 by mole in the composite oxide.

In the first aspect of the present invention, the noble metal catalyst ingredient can be composited with the second support.

In the first aspect of the present invention, the first support and the $NO_x$ storage member can form a composite oxide.

In the first aspect of the present invention, part of the $NO_x$ storage member can be included in the catalyst ingredient loading layer.

In the first aspect of the present invention, the $NO_x$ storage member involved in the first support can be at least one element selected from the group consisting of alkali metals; and another $NO_x$ storage member can be further involved in the second support, and can be selected from the group consisting of alkaline-earth metals.

In the first aspect of the present invention, the $NO_x$ storage member involved in the first support can be at least one element selected from the group consisting of alkaline-earth metals; and another $NO_x$ storage member can be further involved in the second support, and can be selected from the group consisting of alkali metals.

In a second aspect of the present invention, a process for producing a catalyst for purifying an exhaust gas comprises the steps of:

forming a core powder by mixing a salt of an $NO_x$ storage member with a first alkoxide so as to form a solution, the $NO_x$ storage member being at least one element selected from the group consisting of alkali metals and alkaline-earth metals, the first alkoxide including a first metal, hydrolyzing the resulting solution and firing the resulting hydrolyzed product, the core powder including a composite oxide formed of the $NO_x$ storage member and the first metal; and forming a catalyst ingredient loading layer on the core powder by mixing the core powder with a solution, the solution including a second alkoxide and ions of a noble metal, the second alkoxide including a second metal, hydrolyzing the resultant mixture and firing the resulting hydrolyzed product, the noble metal and the second metal being composited to form the catalyst ingredient loading layer on the core powder.

In the second aspect of the present invention, the forming of the catalyst ingredient loading layer can be carried out by adding an aqueous solution including the ions of the noble metal to the solution including the core powder and the second alkoxide, and hydrolyzing the resultant mixture.

According to the first aspect of the present invention, it is possible to smoothly develop the generation of $NO_x$ by oxidizing NO, the storage of the generated $NO_x$ into the $NO_x$ storage member, the reduction of the $NO_x$ released from the $NO_x$ storage member. Thus, the present exhaust gas purifying catalyst can keep the high $NO_x$ purifying performance in a fuel-lean atmosphere (or an oxygen-rich atmosphere) as well as at the stoichiometric point or in a fuel-rich atmosphere (or an oxygen-lean atmosphere). Hence, the present exhaust gas purifying catalyst can efficiently reduce $NO_x$ included even in an exhaust gas emitted from a lean-burn engine. Moreover, the present exhaust gas purifying catalyst is superb in terms of the durability so that it can keep the high $NO_x$ purring performance for a long period of time.

In addition, when part of the $NO_x$ storage member is included in the catalyst ingredient loading layer, the resulting present exhaust gas purifying catalyst has a widened temperature window where it can purify $NO_x$ efficiently. Consequently, such a present exhaust gas purifying catalyst can purify $NO_x$ over a wide temperature range.

According to the second aspect of the present invention, it is possible not only to readily and securely form the core powder in which the $NO_x$ storage member and the first metal are highly dispersed on atomic level, but also to readily and securely form the catalyst ingredient loading layer, in which the noble metal and the second metal are highly dispersed on atomic level, on the core powder. Therefore, it is possible to readily and stably produce the present exhaust gas purifying catalyst.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
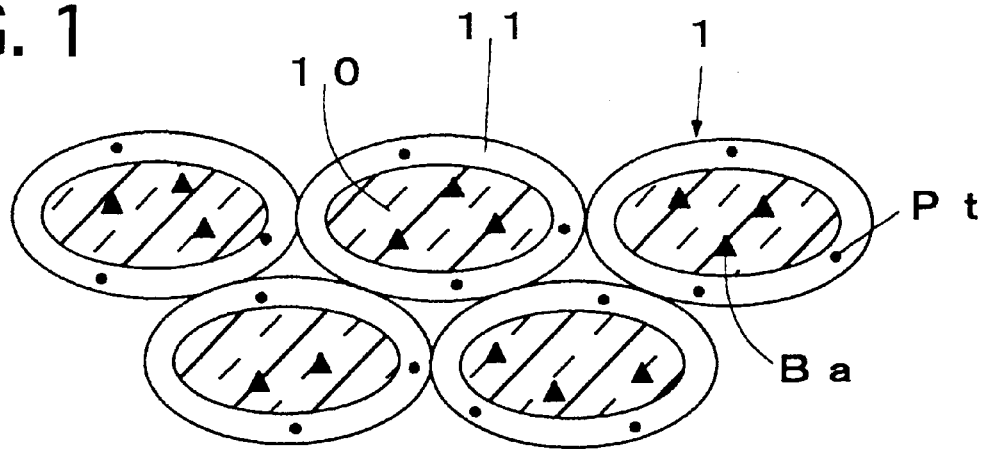
FIG. 1 is a schematic cross-sectional view of an exhaust gas purifying catalyst of a First Preferred Embodiment according to the present invention.

Having generally described the present invention, a further understanding can be obtained by reference to the specific preferred embodiments which are provided herein for purposes of illustration only and are not intended to limit the scope of the appended claims.

In the exhaust gas purifying catalyst according to the first aspect of the present invention, the $NO_x$ storage member is involved in the core together with the first support. The core constitutes the central member of the present catalyst. Moreover, the nobel metal catalyst ingredient is loaded in the catalyst ingredient loading layer along with the second support. The catalyst ingredient loading layer constitutes the external member of the present catalyst. Thus, the noble metal catalyst ingredient and the $NO_x$ storage member are separated from each other so that the sintering of the noble metal ingredient, which is facilitated by the $NO_x$ storage member, is slowed. As a result, the $NO_x$ purifying performance of the present catalyst can be improved.

Although the noble metal catalyst ingredient and the $NO_x$ storage member are separated from each other, they are disposed in such proximity to each other that the first step of the $NO_x$ purifying reaction, in which NO included in the exhaust gas is oxidized in a fuel-lean atmosphere (or an oxygen-rich atmosphere), and the second step of storing the $NO_x$ into the $NO_x$ storage member can be carried out smoothly. Moreover, the third step of reducing the $NO_x$ can be carried out smoothly. As result, the initial $NO_x$ purifying performance of the present exhaust gas purifying catalyst can be kept equal to those of the conventional exhaust gas purifying catalysts.

Specifically, in a fuel-lean atmosphere (or an oxygen-rich atmosphere), NO, included in the exhaust gas, is oxidized by the noble metal catalyst ingredient when it passes through the catalyst ingredient loading layer. The resulting $NO_x$ is stored into the inner $NO_x$ storage element efficiently. Then, at the stoichiometric point or in a fuel-rich atmosphere (or an oxygen-lean atmosphere), the stored $NO_x$ is released from the $NO_x$ storage member, and is reacted with HC and CO, which exist in the atmosphere, by the noble metal catalyst ingredient when it again passes through the catalyst ingredient loading layer. Thus, the $NO_x$ is reduced efficiently. Consequently, the initial $NO_x$ purifying performance of the present exhaust gas purifying catalyst can be kept equal to those of the conventional exhaust gas purifying catalysts.

Whilst, $SO_x$ exhibits a slower diffusion rate than that of $NO_x$. Accordingly, in the present exhaust gas purifying catalyst, it is possible for $NO_x$ to pass through the catalyst ingredient loading layer, but it is difficult for $SO_x$ to pass therethrough. Consequently, in a fuel-lean atmosphere (or an oxygen-rich atmosphere), the $SO_x$, included in the exhaust gas, is believed to be adsorbed on the second support of the catalyst ingredient loading layer so that it is inhibited from reaching the core. On the contrary, part of the $NO_x$ is believed to be adsorbed on the second support, but most of the $NO_x$ is believed to pass through the catalyst ingredient loading layer and to be eventually stored into the $NO_x$ storage member of the core.

Then, at the stoichiometric point or in a fuel-rich atmosphere (or an oxygen-lean atmosphere), $SO_x$ is separated from the second support, and is discharged into the atmosphere. Accordingly, the $NO_x$ storage member is inhibited from being poisoned by sulfur. Moreover, the $NO_x$ is separated from the $NO_x$ storage member, and passes through the catalyst ingredient loading layer. The released $NO_x$ is reacted with HC and CO, included in the exhaust gas, by the catalytic action of the noble metal catalyst ingredient when it passes through the catalyst ingredient loading layer. Thus, the $NO_x$ is purified, and is discharged into the atmosphere.

Specifically, the $SO_x$ is repeatedly adsorbed onto and released from the second support of the catalyst ingredient loading layer only, and is kept from contacting with the underlying core. As a result, it is possible to inhibit the $NO_x$ from being poisoned by sulfur.

The core is constituted by including the first support and the $NO_x$ storage member. The $NO_x$ storage member can be simply loaded on the first support, and can further preferably composited with the first support so as to form a crystalline or amorphous composite oxide. With the latter arrangement, the $NO_x$ storage capability of the present exhaust gas purifying catalyst can be furthermore enhanced because the $NO_x$ storage member is highly dispersed in the first support on atomic order.

In the core, the content of the $NO_x$ storage member can preferably fall in a range of from 0.05 to 10 moles with respect to 1 mole of the first support. When the content of the $NO_x$ is less than 0.05 moles with respect to 1 mole of the first support, the resulting exhaust gas purifying catalyst hardly exhibits the $NO_x$ storing capability. When the content of the $NO_x$ is more than 10 moles with respect to 1 mole of the first support, the durability of the resulting exhaust gas purifying catalyst deteriorates.

In addition, an average particle diameter of the core can preferably fall in a range of from 0.1 to 10 μm. When the average particle diameter of the core is less than 0.1 μm, the core and the catalyst ingredient layer are less likely to form lamelarly. When the average particle diameter of the core is more than 10 μm, the $NO_x$ storage member is utilized less effectively.

The first support can be, for example, at least one member selected from the group consisting of alumina, titania, zirconia, silica, silica-alumina, silica-titania and zeolite. Note that a plurality of the members can be used as the first support by mixing or compositing them.

The $NO_x$ storage member can be, for instance, at least one element selected from the group consisting of alkali metals, alkaline-earth metals and rare-earth elements. Among these elements, it is further preferred to select either the alkali metals or alkaline-earth metals, because they are highly alkaline and exhibit a high $NO_x$ storage capability. The alkali metals are the group 1A elements in the periodic table of element, and can be exemplified by lithium, sodium, potassium, rubidium, cesium and fancium. The alkaline-earth metals are the group 2A elements in the periodic table of the elements, and can be exemplified by barium, beryllium, magnesium, calcium and strontium. The rare-earth elements herein mean not only the chemical elements with atomic numbers 58 to 71, which can be exemplified by cerium, praseodymium and neodymium, dysprosium, ytterbium, etc., but also scandium, yttrium and lanthanum.

In order to furthermore inhibit the $NO_x$ storage member from being poisoned by sulfur, it is preferred to constitute the first support by simultaneously employing titania ($TiO_2$) and alumina ($Al_2O_3$). When titania is added to alumina, the sulfur oxides are furthermore inhibited from depositing on the $NO_x$ storage member. Moreover, when the exhaust gas atmosphere is varied from a fuel-lean atmosphere (or an oxygen-rich atmosphere) to the stoichiometric point or a fuel-rich atmosphere (or an oxygen-lean atmosphere), the reaction products, resulting from the $NO_x$ storage member and the sulfur oxides, can be decomposed and eliminated facilitatively. Accordingly, the $NO_x$ storage capability of the $NO_x$ storage member is likely to revive even when the $NO_x$ storage member is poisoned by sulfur.

However, when the first support is made by simply mixing alumina and titania, the reaction products, resulting from the $NO_x$ storage member and the sulfur oxides, cannot be facilitatively decomposed and eliminated satisfactorily when the exhaust gas atmosphere is varied from a fuel-lean atmosphere (or an oxygen-rich atmosphere) to the stoichiometric point or a fuel-rich atmosphere (or an oxygen-lean atmosphere). Even worse, the first support may be deteriorated when it is subjected to a high temperature durability test carried out at about 600° C. Consequently, the resulting exhaust gas purifying catalyst may lack the required durability.

In order to avoid the drawback, it is preferred to make the first support from a composite oxide of alumina and titania. With this arrangement, the durability of the resulting present exhaust gas purifying catalyst can be furthermore upgraded, and the $NO_x$ storage member can be furthermore inhibited from being poisoned by sulfur.

When making the first support from a composite oxide of alumina and titania, a composition ratio of $TiO_2$ with respect to $Al_2O_3$ can preferably fall in a range of from 1:2 to 1:9 by mole in the composite oxide. When the content of titania is less than the range, the advantage of the titania addition is effected less so that the $NO_x$ purifying performance of the resultant exhaust gas purifying catalyst degrades. When the content of titania is more than the range, the $NO_x$ purifying performance of the resultant exhaust gas purifying catalyst degrades because the heat resistance of the composite oxide may presumably deteriorate. Note that the composition ratio of $TiO_2$ with respect to $Al_2O_3$ can furthermore preferably fall in a range of from 1:4 to 1:9 by mole in the composite oxide.

The catalyst ingredient loading layer is constituted by the second support and the noble metal catalyst ingredient. The second support can be, for example, at least one member selected from the group consisting of alumina, titania, zirconia, silica, silica-alumina, silica-titania and zeolite. Note that a plurality of the members can be used as the second support by mixing or compositing them. Among the members, it is furthermore preferred to use one which is likely to adsorb $SO_2$ thereon, and from which the adsorbed $SO_2$ is likely to be eliminated. Therefore, it is most preferred to use alumina as the second support. Also note that the first support and second support can be formed of an identical material, or can be formed of different materials.

The catalyst ingredient loading layer can be formed of alumina alone, or can include a simple oxide, such as titania and zirconia. Further, the catalyst ingredient loading layer can be formed by compositing the simple oxide with alumina. Furthermore, the thus prepared catalyst ingredient loading layer can further include $CeO_2$, or $CeO_2$-$ZrO_2$. If such is the case, the sintering of the noble metal catalyst ingredient can be furthermore prohibited. Consequently, the heat resistance of the resulting present exhaust gas purifying catalyst can be furthermore improved. The content of titania or zirconia can preferably fall in a range of from 0.01 to 70% by weight in the catalyst ingredient loading layer. When the content is less than 0.01% by weight in the catalyst ingredient loading layer, the advantage of the addition is effected insufficiently. When the content is more than 70% by weight in the catalyst ingredient loading layer, the heat resistance of the resulting catalyst ingredient loading layer is improper.

Moreover, the catalyst ingredient loading layer can further preferably include a transition metal. When the catalyst ingredient loading layer further includes a transition metal, the $SO_x$ is adsorbed on and eliminated from the catalyst ingredient loading layer furthermore actively. As a result, the chances are furthermore slim where the $NO_x$ storage member and the $SO_x$ contact with each other. Thus, the $NO_x$ storage member can be furthermore inhibited from being poisoned by sulfur. The transition metal can be exemplified by nickel, vanadium, and iron. The content of the transition metal can preferably fall in a range of from 1 to 50% by weight in the catalyst ingredient loading layer. When the content of the transition metal is less than 1% by weight in the catalyst ingredient loading layer, the advantage of the addition is effected insufficiently. When the content is more than 50% by weight in the catalyst ingredient loading layer, the heat resistance of the resulting catalyst ingredient loading layer is improper.

The noble metal catalyst ingredient can be exemplified by platinum (Pt), rhodium (Rh), palladium (Pd), silver (Ag), gold (Au) and iridium (Ir). The loading amount of the noble metal catalyst ingredient can preferably be determined as desired in a range of from 0.5 to 20% by weight in the catalyst ingredient loading layer. When the loading amount of the noble metal catalyst ingredient is less than 0.5% by weight in the catalyst ingredient loading layer, the $NO_x$ purifying performance of the resulting exhaust gas purifying catalyst is degraded impractically. When the loading amount of the noble metal catalyst ingredient is more than 20% by weight in the catalyst ingredient loading layer, the $NO_x$ purifying performance of the resulting exhaust gas purifying catalyst is saturated, and such a large loading amount pushes up the material cost. In particular, the loading amount of the noble metal catalyst ingredient can furthermore preferably fall in a range of from 1 to 10% by weight in the catalyst ingredient loading layer.

The noble metal catalyst ingredient can be present in the catalyst ingredient loading layer as simply loaded. In particular, the noble metal catalyst ingredient can be loaded compositely in the catalyst ingredient loading layer as composited with the second support. With the latter arrangement, the noble metal catalyst ingredient is uniformly dispersed in the second support on atomic order. Thus, the noble metal catalyst ingredient is kept from moving, and accordingly is inhibited from sintering. Consequently, the heat resistance of the resulting catalyst ingredient loading layer is furthermore enhanced, and the specific surface area of the noble metal catalyst ingredient can be kept large even after the catalyst ingredient loading layer is subjected to a durability test. As a result, the $NO_x$ purifying performance of the present exhaust gas purifying catalyst can be furthermore upgraded.

In this instance, all of the loaded noble metal catalyst ingredient can contribute to the reduction of $NO_x$ because the noble metal catalyst ingredient is loaded or compositely loaded in the catalyst ingredient loading layer alone, and because the $NO_x$ never fails to go in and out the catalyst ingredient loading layer. Therefore, it is possible to effectively utilize the all of the noble metal catalyst ingredient included in the catalyst ingredient loading layer.

In order to furthermore inhibit Pt from sintering, it has been known to coexist Rh with Pt. In the present invention as well, Rh can be loaded together with Pt. Rh can be loaded coexistingly with Pt in the catalyst ingredient loading layer. Alternatively, Rh can be coexisted with the $NO_x$ storage member in the core. In either case, Pt can be similarly inhibited from sintering.

As earlier mentioned, in the present exhaust gas purifying catalyst, a composition ratio of the core with respect to the catalyst ingredient loading layer can preferably fall in a range of from 1:2 to 8:1 by weight. When the composition ratio of the catalyst ingredient loading layer is less than the range, the noble metal catalyst ingredient is sintered facilitatively. The disadvantage stems from the fact that, when the noble metal catalyst ingredient is loaded in a predetermined amount, the density of the noble metal catalyst ingredient is too high and the distance between the $NO_x$ storage member and the noble metal catalyst ingredient is too close. When the composition ratio of the catalyst ingredient loading layer is more than the range, the $NO_x$ purifying performance of the resulting exhaust gas purifying catalyst is degraded. The disadvantage results from the fact that the density of the noble metal catalyst ingredient is so low that it is buried in the second support and the exposed surface area of the noble metal catalyst ingredient is decreased.

Moreover, when the thickness of the noble metal catalyst ingredient is too thin, the $SO_x$ passes through the catalyst ingredient loading layer to unpreferably contact with the $NO_x$ storage member with an enlarged probability. On the contrary, when the thickness of the noble metal catalyst ingredient is too thick, it is difficult for the $NO_x$ to pass through the catalyst ingredient loading layer and it is hard for the $NO_x$ storage member to adsorb the $NO_x$ thereon. Thus, there is an optimum range for the thickness of the catalyst ingredient loading layer. Specifically, the thickness of the catalyst ingredient loading layer can preferably fall in a range of from $1/100$ to $1/2$ of the average particle diameter of the core.

When the $NO_x$ storage member is included only in the core, the resulting present exhaust gas purifying catalyst may exhibit a low $NO_x$ purifying capability in a high temperature range, and may have a narrow temperature window where it can purify $NO_x$ efficiently. Moreover, the present exhaust gas purifying catalyst may exhibit a low $NO_x$ conversion initially.

Therefore, in a modified version of the present exhaust gas purifying catalyst, part of the $NO_x$ storage member can be included in the catalyst ingredient loading layer. With the arrangement, not only the resultant present exhaust gas purifying catalyst can exhibit an upgraded initial $NO_x$ purifying performance, but also can purity $NO_x$ efficiently over a wide temperature range of from a low temperature to a high temperature.

The $NO_x$ storage member can be included in the catalyst ingredient loading layer in a small amount of from 0.01 to 0.1 mole with respect to 180 grams of the resultant catalyst powder. When the inclusion of the $NO_x$ storage member is more than 0.1 mole with respect to 180 grams of the resulting catalyst powder, the noble metal catalyst ingredient is likely to sinter. Consequently, the durability of the resulting exhaust gas purifying catalyst may be reduced.

The type of the $NO_x$ storage member to be included in the catalyst ingredient loading layer can be identical with the $NO_x$ storage member included in the core, or can be different therefrom. The $NO_x$ storage member to be included in the catalyst ingredient loading layer can preferably be at least one member selected from the group consisting of alkaline-earth metals because the alkaline-earth metals are less likely to cause the sintering of the noble metal catalyst ingredient than the alkali metals.

Moreover, the $NO_x$ storage member to be included in the catalyst ingredient loading layer can preferably be disposed in the vicinity of the surface of the core, or can further preferably be disposed so as to go along on the surface of the core. With the arrangement, the distance or interval between the noble metal catalyst ingredient and the $NO_x$ storage member can be enlarged. As a result, the sintering of the noble metal catalyst ingredient can be inhibited furthermore effectively.

In addition, in the modified version of the present exhaust gas purifying catalyst, when the $NO_x$ storage member involved in the first support is an alkali metal, another $NO_x$ storage member further involved in the second support can preferably be an alkaline-earth metal. Alternatively, when the $NO_x$ storage member involved in the first support is an alkaline-earth metal, another $NO_x$ storage member further involved in the second support can preferably an alkali metal. In either case, the resulting present exhaust gas purifying catalyst has a widened temperature window where it can purify $NO_x$ efficiently.

In the process for producing an exhaust gas purifying catalyst according to the second aspect of the present invention, the salt of an $NO_x$ storage member is first mixed with the first alkoxide, and the resultant mixture is heated to prepare the solution in the core forming step. The $NO_x$ storage member is at least one element selected from the group consisting of alkali metals and alkaline-earth metals. The first alkoxide includes the first metal. The resulting solution is then hydrolyzed by adding water thereto. A sol-gel reaction takes place to produce a gel in which the first metal takes in the $NO_x$ storage member. The resultant gel is dried, and is thereafter pulverized. The pulverized gel is then fired to prepare the core powder which is formed of a composite oxide including the $NO_x$ storage member and the first metal.

The first metal can be exemplified by aluminum (Al), titanium (Ti), silicon (Si), zirconium (Zr), and so on. The alkali metals and alkaline-earth metals can be exemplified by the above-described elements used for the $NO_x$ storage member.

In the subsequent catalyst ingredient loading layer forming step, the core powder is mixed with the solution, and the resultant mixture is thereafter hydrolyzed. The solution includes the second alkoxide and the ions of the noble metal. The second alkoxide includes the second metal. Finally, the resulting hydrolyzed product is fired to form the catalyst ingredient loading layer on the core powder. In the thus prepared catalyst ingredient loading layer, the noble metal is composited with the second metal.

The second metal can be exemplified by aluminum (Al), titanium (Ti), silicon (Si), zirconium (Zr), and so on. The noble metal for constituting the ions of the noble metal can be exemplified by the above-described noble metals used for the noble metal catalyst ingredient.

In the catalyst ingredient loading layer forming step, a hydrolyzing reaction results in a sol-gel reaction. Consequently, the second metal is precipitated on the core powder so as to take in the ions of the noble metal therein. The core powder with the second metal and the ions of the noble metal deposited thereon is dried, and is thereafter fired. Thus, on the core powder, there is formed the catalyst ingredient loading layer in which the noble metal and the second metal are composited.

When the solution, including the second alkoxide and the ions of the noble metal, is prepared out of a system free from water, and when the core powder is added followed by the addition of water, the hydrolyzing reaction occurs in the catalyst ingredient loading layer forming step. In this instance, it is possible to utilize the water, which is adsorbed in the core powder, as the water source. If such is the case, however, the thickness of the resulting catalyst ingredient loading layer is so thin that the sintering of the noble metal is likely to take place unpreferably. Hence, after the core powder is mixed with the solution including the second alkoxide and the ions of the noble metal element, it is preferred to add water in an amount necessary and sufficient for causing the hydrolyzing reaction. For instance, as earlier mentioned, it is preferable to add the aqueous solution, including the ions of the noble metal, to the solution, including the core powder and the second alkoxide, and to hydrolyze the resultant mixture.

Thus, the present production process according to the second aspect of the present invention can readily and securely form the core powder in which the $NO_x$ storage member and the first metal are highly dispersed on atomic level. Moreover, the present production process can readily and securely form the catalyst ingredient loading layer, in which the noble metal and the second metal are highly dispersed on atomic level, on the core powder.

The thus produced catalyst powder can be employed as an exhaust gas purifying catalyst in the following manner: namely; it is deposited to form a coating layer on a honeycomb-shaped support substrate formed of cordierite or metal, or on a pellet-shaped support substrate. In certain applications, a pellet-shaped support substrate can be made from the resultant catalyst powder alone.

The present invention will be hereinafter described in detail with reference to preferred embodiments and comparative examples.

First Preferred Embodiment

FIG. 1 illustrates a cross-sectional view of an exhaust gas purifying catalyst of a First Preferred Embodiment according to the present invention. As illustrated in FIG. 1, the exhaust gas purifying catalyst comprises an assembly of a catalyst powder 1. The catalyst powder 1 includes a core 10, and an alumina layer 11 formed on the core 10. The core 10 is formed of alumina, and barium (Ba) is loaded therein. The loaded Ba works as the $NO_x$ storage member. The alumina layer 11 includes platinum (Pt) loaded therein. The loaded Pt works as the noble metal catalyst ingredient.

The production process of the exhaust gas purifying catalyst will be hereinafter described instead of the detailed description on the arrangements thereof.

An aqueous solution of barium acetate having a predetermined concentration was impregnated into a γ-alumina powder in a prescribed amount. The γ-alumina powder was dried at 120° C. for 12 hours, and fired at 500° C. for 1 hour to prepare a core powder which included alumina loaded with Ba. Note that the Ba was included in the core powder in an amount of 20% by weight.

Whilst, a solution was prepared in which aluminum tri-sec-butoxide $(Al(O\text{-sec-}C_4H_9)_3)$ was dissolved in 2-propanol in an amount of 0.05 mole/L. A predetermined amount of the solution was mixed with a prescribed amount of the core powder. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process.

Finally, a predetermined amount of an aqueous solution, in which platinum dinitrodiammine was dissolved in an aqueous nitric acid solution, was impregnated into the resultant core powder provided with the alumina layer to load Pt therein. Note that the loading amount of the Pt was 1.45% by weight. Then, pellets were prepared out of the thus prepared catalyst powder by an ordinary process. The exhaust gas purifying catalyst of the First Preferred Embodiment was thus completed.

Second Preferred Embodiment

A solution was prepared in which aluminum tri-sec-butoxide $(Al(O\text{-sec-}C_4H_9)_3)$ and nickel nitrate were dissolved in 2-propanol in an amount of 0.05 mole/L and 0.01 mole/L, respectively. A predetermined amount of the solution was mixed with a prescribed amount of the same core powder as prepared in the First Preferred Embodiment. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process.

Finally, a predetermined amount of an aqueous solution, in which platinum dinitrodiammine was dissolved in an aqueous nitric acid solution, was impregnated into the resultant core powder provided with the alumina layer to load Pt therein. Note that the loading amount of the Pt was 1.41% by weight. Then, pellets were prepared out of the thus prepared catalyst powder by an ordinary process. The exhaust gas purifying catalyst of the Second Preferred Embodiment was thus completed.

Third Preferred Embodiment

A solution was prepared in which aluminum tri-sec-butoxide ($Al(O\text{-sec-}C_4H_9)_3$) and titanium tri-sec-butoxide ($Ti(O\text{-sec-}C_4H_9)_3$) were dissolved in 2-propanol in an amount of 0.05 mole/L and 0.01 mole/L, respectively. A predetermined amount of the solution was mixed with a prescribed amount of the same core powder as prepared in the First Preferred Embodiment. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process.

Finally, a predetermined amount of an aqueous solution, in which platinum dinitrodiammine was dissolved in an aqueous nitric acid solution, was impregnated into the resultant core powder provided with the alumina layer to load Pt therein. Note that the loading amount of the Pt was 1.46% by weight. Then, pellets were prepared out of the thus prepared catalyst powder by an ordinary process. The exhaust gas purifying catalyst of the Third Preferred Embodiment was thus completed.

Fourth Preferred Embodiment

A solution was prepared in which aluminum tri-sec-butoxide ($Al(O\text{-sec-}C_4H_9)_3$) and platinic chloride (or chloroplatinic acid $H_2PtCl_6$) were dissolved in 2-propanol in an amount of 0.05 mole/L and 0.05 mole/L, respectively. A predetermined amount of the solution was mixed with a prescribed amount of the same core powder as prepared in the First Preferred Embodiment. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process. Note that the Pt was loaded compositely with $Al_2O_3$ in the alumina layer, and that the composite loading amount of the Pt was 1.5% by weight.

Then, pellets were prepared out of the thus prepared catalyst powder by an ordinary process. The exhaust gas purifying catalyst of the Fourth Preferred Embodiment was thus completed.

Fifth Preferred Embodiment

A solution was prepared in which aluminum tri-sec-butoxide ($Al(O\text{-sec-}C_4H_9)_3$), platinic chloride and titanium tri-sec-butoxide ($Ti(O\text{-sec-}C_4H_9)_3$) were further dissolved in 2-propanol in an amount of 0.05 mole/L, 0.05 mole/L and 0.01 mole/L, respectively. A predetermined amount of the solution was mixed with a prescribed amount of the same core powder as prepared in the First Preferred Embodiment. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process. Note that the Pt was loaded compositely with $Al_2O_3$ and $TiO_2$ in the alumina layer, and that the composite loading amount of the Pt was 1.5% by weight.

Then, pellets were prepared out of the thus prepared catalyst powder by an ordinary process. The exhaust gas purifying catalyst of the Fifth Preferred Embodiment was thus completed.

Sixth Preferred Embodiment

A core powder was prepared out of a mixed propanol solution by a sol-gel process. The mixed propanol solution included barium alkoxide and aluminum tri-sec-butoxide ($Al(O\text{-sec-}C_4H_9)_3$). The resulting core powder included a composite oxide having a composition, $BaO.4Al_2O_3$.

Whilst, a solution was prepared in which aluminum tri-sec-butoxide ($Al(O\text{-sec-}C_4H_9)_3$) was dissolved in 2-propanol in an amount of 0.05 mole/L. A predetermined amount of the solution was mixed with a prescribed amount of the core powder. The resulting mixture was stirred at room temperature for 1 hour, and was filtered. The filtered residue was washed, dried at 120° C. for 12 hours, and fired at 500° C. for 1 hour. Thus, an alumina layer was formed on the core powder by a sol-gel process.

Finally, a predetermined amount of an aqueous solution, in which platinum dinitrodiammine was dissolved in an aqueous nitric acid solution, was impregnated into the resultant core powder provided with the alumina layer to load Pt therein. Note that the loading amount of the Pt was 1.40% by weight. Then, pellets were prepared out of the thus prepared catalyst powder by an ordinary process. The exhaust gas purifying catalyst of the Sixth Preferred Embodiment was thus completed.

Comparative Example No. 1

A predetermined amount of an aqueous solution, in which platinum dinitrodiammine was dissolved in an aqueous nitric acid solution, was impregnated into the same core powder as prepared in the First Preferred Embodiment. Note that the loading amount of the Pt was 1.5% by weight. Then, pellets were prepared out of the thus prepared catalyst powder by an ordinary process. The exhaust gas purifying catalyst of Comparative Example No. 1 was thus completed.

(Examination)

The thus prepared pellets of the First through Sixth Preferred Embodiments and Comparative Example No. 1 were respectively put into a durability testing apparatus which utilized a model gas in order to examine the initial conversions. In the examination, a fuel-lean model gas whose air-fuel ratio A/F was 21, and then a fuel-rich model gas whose air-fuel ratio A/F was 12 were flowed through the testing apparatus. Note that the fuel-lean and fuel-rich model gases had a temperature of 350° C. at the inlet of the testing apparatus, and that they were flowed at a space velocity (i.e., SV) of 100,000 $hr^{-1}$. When the fuel-lean model gas was flowed, the exhaust gas purifying catalysts of the First through Sixth Preferred Embodiments and Comparative Example No. 1 were examined for the HC, CO and $NO_x$ conversions. The thus examined HC, CO and $NO_x$ conversions were rated as the respective "Initial Conversions" set forth in Table 2 below.

Moreover, another fuel-lean model gas and another fuel-rich model gas whose compositions are recited in Table 1 below were flowed through the testing apparatus alternately for 20 hours in order to carry out a durability test. Note that the fuel-lean model gas was flowed for 4 minutes, and alternately the fuel-rich model gas was flowed for 30 seconds, and that the temperature of the model gases was 700° C. at the inlet of the testing apparatus, and that an SV of the model gases was 100,000 $hr^{-1}$. Then, in the same manner as the examination of the initial conversions, the exhaust gas purifying catalysts of the First through Sixth Preferred Embodiments and Comparative Example No. 1 were examined for the HC, CO and $NO_x$ conversions. The thus examined HC, CO and $NO_x$ conversions were rated as the respective "Conversions after Durability Test" set forth in Table 2 below. The results of the examination are summarized in Table 2 below.

The conversions were calculated by the following equation:

Conversion (%)=[{(Inlet Gas Content)−(Outlet Gas Content)}/ (Inlet Gas Content)]×100.

According to Table 2 below, after the durability test, the exhaust gas purifying catalyst of Comparative No. 1 exhibited an $NO_x$ conversion lower than those of the First through Sixth Preferred Embodiments did. The exhaust gas purifying catalysts of the First through Sixth Preferred Embodiments thus exhibited $NO_x$ conversions higher than Comparative Example No. 1 did. The advantage apparently resulted from the arrangement that the alumina layer including the Pt is disposed on the support including the Ba and alumina.

Further, when the First Preferred Embodiment is compared with the Second and Third Preferred Embodiments, it is understood that the $NO_x$ conversion after the durability test was further improved by compositing the Ni or Ti with the alumina layer.

Furthermore, when the First through Third Preferred Embodiments are compared with the Fourth and Fifth Preferred Embodiments, it is appreciated that the HC and CO conversions were remarkably upgraded and simultaneously the $NO_x$ conversion was enhanced to a certain extent by compositing the Pt with the alumina layer. The advantage was effected by inhibiting the Pt from sintering.

TABLE 1

| | CO (%) | $C_3H_6$ (ppmC) | $CO_2$ (%) | $H_2O$ (%) | NO (ppm) | $O_2$ (%) | $SO_2$ (ppm) | $N_2$ |
|---|---|---|---|---|---|---|---|---|
| Fuel-lean Model Gas | 0.1 | 2000 | 10.0 | 10.0 | 500 | 6.5 | 3000 | Balance |
| Fuel-rich Model Gas | 5.0 | 3000 | 12.0 | 10.0 | 500 | 0 | 3000 | Balance |

TABLE 2

| | Alumina Layer | Core | Initial Conversion (%) | | | Conversion after Durability Test (%) | | |
|---|---|---|---|---|---|---|---|---|
| | | | HC | CO | $NO_x$ | HC | CO | $NO_x$ |
| 1st Pref. Embodiment | with Pt loaded | with Ba loaded | 96 | 99 | 90 | 68 | 70 | 57 |
| 2nd Pref. Embodiment | with Ni composited & with Pt loaded | with Ba loaded | 98 | 99 | 91 | 67 | 71 | 72 |
| 3rd Pref. Embodiment | with Ti composited & with Pt loaded | with Ba loaded | 98 | 99 | 89 | 69 | 70 | 71 |
| 4th Pref. Embodiment | with Pt composited | with Ba loaded | 97 | 98 | 90 | 80 | 82 | 60 |
| 5th Pref. Embodiment | with Ti composited & with Pt composited | with Ba loaded | 97 | 99 | 90 | 87 | 90 | 74 |
| 6th Pref. Embodiment | with Pt loaded | with Ba composited | 96 | 99 | 91 | 70 | 71 | 58 |
| Comp. Ex. No. 1 | none | with Ba & Pt loaded | 98 | 99 | 93 | 69 | 70 | 29 |

Seventh Preferred Embodiment

Figure 2:
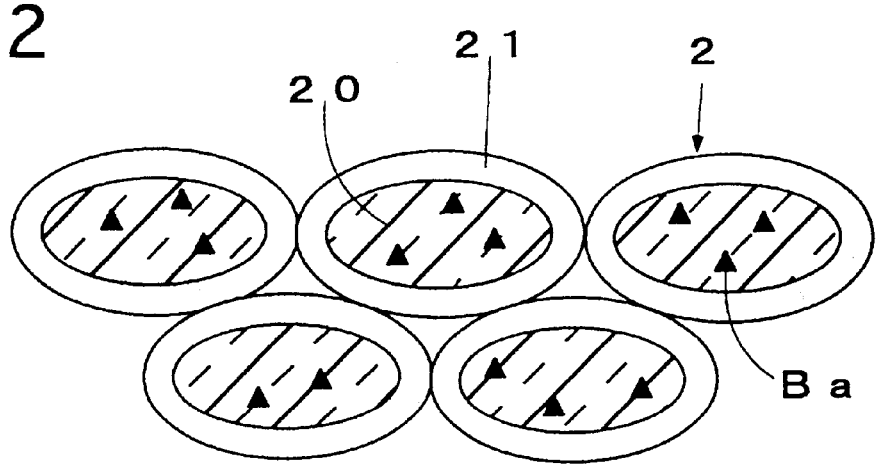
FIG. 2 is a schematic cross-sectional view of an exhaust gas purifying catalyst of a Seventh Preferred Embodiment according to the present invention.

FIG. 2 illustrates a cross-sectional view of an exhaust gas purifying catalyst of a Seventh Preferred Embodiment according to the present invention. As illustrated in FIG. 2, the exhaust gas purifying catalyst comprises an assembly of a catalyst powder 2. The catalyst powder 2 includes a core 20, and an alumina layer 21 formed on the core 20. The core 20 is formed of alumina, and barium (Ba) is loaded therein. The loaded Ba works as the $NO_x$ storage member. The alumina layer 21 includes platinum (Pt) composited therewith.

The production process of the exhaust gas purifying catalyst will be hereinafter described instead of the detailed description on the arrangements thereof.

(Core Powder Forming)

An aqueous solution of barium acetate was impregnated into 100 grams of an activated alumina powder in a predetermined amount. The activated alumina powder had an average particle diameter of 10 μm. The impregnated activated alumina powder was dried at 110° C. for 3 hours, and fired at 500° C. for 2 hours to load Ba therein. The core powder 20 was thus completed. Note that the loading amount of the Ba was 0.1 mole with respect to 100 grams of the alumina in the core powder 20.

(Catalyst Ingredient Loading Layer Forming)

Then, a predetermined amount of isopropyl alcohol was put into a container made from stainless steel. Aluminum tri-isopropoxide ($Al(OC_3H_7)_3$) was mixed with and dissolved in the isopropyl alcohol. Note that the addition of the aluminum tri-isopropoxide could be converted as 100 grams of $Al_2O_3$. The resulting mixture was mixed with 100 grams of the core powder prepared as above, and stirred well to disperse the core powder therein. In addition, an aqueous solution of platinum ammine hydroxide salt was further dropped into the mixture at 80° C. Thus, the aluminum tri-isopropoxide was hydrolyzed, and a gel was formed on the core powder. The gel included alumina involving Pt. The gel was heated to evaporate the solvents, and was calcinated in a nitrogen atmosphere. Thereafter, the calcinated gel was fired at 500° C. in air for 3 hours. Thus, the catalyst ingredient loading layer 21 was formed on the core powder 20.

Note that the catalyst ingredient loading layer 21 was formed with respect to the core powder 20 in a ratio of 1/1 by weight, and that the Pt was composited in an amount of 2 grams with respect to 100 grams of the alumina in the catalyst ingredient loading layer 21. Specifically, in the resulting catalyst powder, the Ba was loaded in an amount of 0.1 mole with respect to 200 grams of the catalyst powder, and the Pt was loaded compositely in an amount of 2 grams with respect to 200 grams of the catalyst powder.

(Catalyst Perpetration)

The thus prepared catalyst powder was molded into pellets having a diameter of from 2 to 3 mm by an ordinary process. Pellet-shaped catalysts of the Seventh Preferred Embodiment were thus completed.

(Examination)

The resultant pellet-shaped catalysts of the Seventh Preferred Embodiment were put into a durability testing apparatus which utilized a model gas in order to carry out a durability test. In the durability test, a fuel-lean model gas and a fuel-rich model gas whose compositions are recited in Table 3 below were flowed through the testing apparatus alternately for 7 hours. Note that the fuel-rich model gas was flowed for 1 minute, and alternately the fuel-lean model gas was flowed for 4 minutes, and that the temperature of the model gases was 700° C. at the inlet of the testing apparatus.

TABLE 3

| | NO (ppm) | CO (%) | $C_3H_6$ (ppmC) | $O_2$ (%) | $CO_2$ (%) | $H_2O$ (%) | $N_2$ |
|---|---|---|---|---|---|---|---|
| Fuel-lean Model Gas (A/F = 21) | 500 | 0.1 | 2000 | 6.5 | 10.0 | 10.0 | Balance |

TABLE 3-continued

| | NO (ppm) | CO (%) | $C_3H_6$ (ppmC) | $O_2$ (%) | $CO_2$ (%) | $H_2O$ (%) | $N_2$ |
|---|---|---|---|---|---|---|---|
| Fuel-rich Model Gas (A/F = 14.5) | 500 | 0.6 | 2000 | 0.4 | 10.0 | 10.0 | Balance |

Thereafter, the initial pellet-shaped catalysts of the Seventh Preferred Embodiments, which had not been subjected to the durability test, and the degraded pellet-shaped catalysts thereof which were subjected to the durability test, were examined for the $NO_x$ conversion, respectively. Specifically, the fuel-lean model gas set forth in Table 3 was flowed through the testing apparatus, and the NO concentrations of the exhaust gas at the inlet and outlet of the testing apparatus were measured, respectively. Note that the temperature of the fuel-lean model gas was 300° C. at the inlet of the testing apparatus, and that the $NO_x$ conversion was derived from the difference between the inlet NO concentration of the exhaust gas and the outlet NO concentration thereof. The results of the examination are summarized in Table 4 below.

Eighth Preferred Embodiment 0.1 mole of Ba was loaded in 150 grams of an activated alumina powder to prepare a core powder in the same manner as the Seventh Preferred Embodiment.

Except that aluminum tri-isopropoxide ($Al(OC_3H_7)_3$) was mixed with and dissolved in isopropyl alcohol so that the addition of the aluminum tri-isopropoxide could be converted as 50 grams of $Al_2O_3$, a catalyst ingredient loading layer was prepared in the identical fashion with the Seventh Preferred Embodiment.

Specifically, except that the weight ratio of the core with respect to the catalyst ingredient loading layer (i.e., the core: the catalyst ingredient loading layer) was set equal to 3:1, a catalyst powder was prepared in the same manner as the Seventh Preferred Embodiment. Note that the Pt was loaded compositely in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Ninth Preferred Embodiment 0.15 moles of Ba was loaded in 250 grams of an activated alumina powder to prepare a core powder in the same manner as the Seventh Preferred Embodiment.

Except that aluminum tri-isopropoxide ($Al(OC_3H_7)_3$) was mixed with and dissolved in isopropyl alcohol so that the addition of the aluminum tri-isopropoxide could be converted as 50 grams of $Al_2O_3$, a catalyst ingredient loading layer was prepared in the identical fashion with the Seventh Preferred Embodiment.

Specifically, except that the weight ratio of the core with respect to the catalyst ingredient loading layer (i.e., the core: the catalyst ingredient loading layer) was set equal to 5:1, a catalyst powder was prepared in the same manner as the Seventh Preferred Embodiment. Note that the Pt was loaded compositely in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Tenth Preferred Embodiment

Instead of the aqueous solution of barium acetate, an aqueous solution of potassium acetate was used in a predetermined amount. Thus, 0.1 mole of K was loaded in 150 grams of an activated alumina powder to prepare a core powder in the same manner as the Seventh Preferred Embodiment.

Except that aluminum tri-isopropoxide ($Al(OC_3H_7)_3$) was mixed with and dissolved in isopropyl alcohol so that the addition of the aluminum tri-isopropoxide could be converted as 50 grams of $Al_2O_3$, a catalyst ingredient loading layer was prepared in the identical fashion with the Seventh Preferred Embodiment.

Note that the weight ratio of the core with respect to the catalyst ingredient loading layer (i.e., the core: the catalyst ingredient loading layer) was set equal to 3:1, that the Pt was loaded compositely in an amount of 2 grams with respect to 200 grams of the catalyst powder, and that the K was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Eleventh Preferred Embodiment

Instead of the activated alumina powder, a commercially available titania ($TiO_2$) powder was used in an amount of 150 grams. The titania was the anatase type, and the titania powder had a specific surface area of 65 $m^2/g$. Other than the titania powder, a core powder was prepared in the same manner as the Seventh Preferred Embodiment. Thus, 0.1 mole of Ba was loaded with respect 150 grams of the core powder.

Except that aluminum tri-isopropoxide ($Al(OC_3H_7)_3$) was mixed with and dissolved in isopropyl alcohol so that the addition of the aluminum tri-isopropoxide could be converted as 50 grams of $Al_2O_3$, a catalyst ingredient loading layer was prepared in the identical fashion with the Seventh Preferred Embodiment.

Note that the weight ratio of the core with respect to the catalyst ingredient loading layer (i.e., the core: the catalyst ingredient loading layer) was set equal to 3:1, that the Pt was loaded compositely in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Twelfth Preferred Embodiment

Instead of the activated alumina powder, a commercially available zirconia ($ZrO_2$) powder was used in an amount of 150 grams. The zirconia powder had a specific surface area of 30 $m^2/g$. Other than the zirconia powder, a core powder was prepared in the same manner as the Seventh Preferred Embodiment. Thus, 0.1 mole of Ba was loaded with respect to 150 grams of the core powder.

Except that aluminum tri-isopropoxide ($Al(OC_3H_7)_3$) was mixed with and dissolved in isopropyl alcohol so that the addition of the aluminum tri-isopropoxide could be converted as 50 grams of $Al_2O_3$, a catalyst ingredient loading layer was prepared in the identical fashion with the Seventh Preferred Embodiment.

Note that the weight ratio of the core with respect to the catalyst ingredient loading layer (i.e., the core: the catalyst ingredient loading layer) was set equal to 3:1, that the Pt was loaded compositely in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Comparative Example No. 2

An aqueous solution, in which dinitrodiammine platinum is dissolved in an aqueous nitric acid solution in a predetermined concentration, was impregnated into 200 grams of the same activated aluminum powder as that of the Seventh Preferred Embodiment in a prescribed amount. The impregnated activated alumina powder was dried at 110° C. for 3 hours, and fired at 500° C. for 2 hours to load Pt therein. Note that the loading amount of the Pt was 2 grams with respect to 200 grams of alumina.

Then, an aqueous solution of barium acetate having a predetermined concentration was impregnated into the resultant activated alumina powder with Pt loaded therein in a prescribed amount. The impregnated activated alumina powder was dried at 110° C. for 3 hours, and fired at 500° C. for 2 hours to load Ba therein. A catalyst powder was thus completed. Note that the loading amount of the Ba was 0.1 mole with respect to 200 grams of the catalyst powder.

Pellet-shaped catalysts were prepared out of the thus prepared catalyst powder, and were examined for the initial $NO_x$ conversion and the $NO_x$ conversion after the durability test in the same manner as the Seventh Preferred Embodiment. The results of the examination are also summarized in Table 4 below.

Reference Example No. 1

0.1 mole of Ba was loaded in 50 grams of an alumina powder to prepare a core powder in the same manner as the Seventh Preferred Embodiment.

Except that aluminum tri-isopropoxide ($Al(OC_3H_7)_3$) was mixed with and dissolved in isopropyl alcohol so that the addition of the aluminum tri-isopropoxide could be converted as 150 grams of $Al_2O_3$, a catalyst ingredient loading layer was prepared in the identical fashion with the Seventh Preferred Embodiment.

Specifically, except that the weight ratio of the core with respect to the catalyst ingredient loading layer (i.e., the core: the catalyst ingredient loading layer) was set equal to 1:3, a catalyst powder was prepared in the same manner as the Seventh Preferred Embodiment. Note that the Pt was loaded composites in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

Reference Example No. 2

0.1 mole of Ba was loaded in 180 grams of an alumina powder to prepare a core powder in the same manner as the Seventh Preferred Embodiment.

Except that aluminum tri-isopropoxide ($Al(OC_3H_7)_3$) was mixed with and dissolved in isopropyl alcohol so that the addition of the aluminum tri-isopropoxide could be converted as 20 grams of $Al_2O_3$, a catalyst ingredient loading layer was prepared in the identical fashion with the Seventh Preferred Embodiment.

Specifically, except that the weight ratio of the core with respect to the catalyst ingredient loading layer (i.e., the core: the catalyst ingredient loading layer) was set equal to 9:1, a catalyst powder was prepared in the same manner as the Seventh Preferred Embodiment. Note that the Pt was loaded compositely in an amount of 2 grams with respect to 200 grams of the catalyst powder, and that the Ba was loaded in an amount of 0.1 mole with respect to 200 grams of the catalyst powder.

Pellet-shaped catalysts made from the core powder were examined for the initial $NO_x$ conversion and the $NO_x$ conversion after the durability test in the identical fashion with the Seventh Preferred Embodiment. The results of the examination are also summarized in Table 4 below.

of the Seventh through Twelfth Preferred Embodiments basically, but exhibited decreased $NO_x$ conversions initially and after the durability test. It is believed that, in Reference Example No. 1, the $NO_x$ storage reaction did not develop sufficiently because the core including the Ba was reduced relatively, and because the Ba was separated from the Pt by an excessively large distance. It is thus assumed that the initial $NO_x$ conversion was lowered. It is believed that the $NO_x$ conversion was decreased to a large extent after the durability test because the core powder and the Ba reacted with each other to deteriorate.

Likewise, the exhaust gas purifying catalyst of Reference Example No. 2 had the same arrangement as that of the Seventh through Twelfth Preferred Embodiments basically, but exhibited decreased $NO_x$ conversions initially and after the durability test. It is believed that, in Reference Example No. 2, both of the NO oxidation reaction and $NO_x$ storage reaction did not proceed smoothly because the particles with the Pt loaded decreased relatively. It is thus assumed that the initial $NO_x$ conversion was lowered. It is believed that the $NO_x$ conversion was decreased to a large extent after the durability test because the Pt was sintered to deteriorate.

In the Seventh through Twelfth Preferred Embodiments, the solution of the aluminum alkoxide was hydrolyzed by first dispersing the core powder therein and then adding the aqueous solution of the Pt salt thereto. Note that, however, the solution of the aluminum alkoxide can be hydrolyzed by using ion-exchanged water, and thereafter the Pt can be conventionally loaded in the resulting catalyst ingredient loading layer by an adsorption loading process or an impregnation loading process. If such is the case, part of the Pt is also loaded in the core. It has been verified, however, that the resulting exhaust gas purifying catalyst can produce the advantage substantially equal to that of the Seventh through

TABLE 4

| | Arrangement of Catalyst Powder | | | Initial $NO_x$ | $NO_x$ Conversion |
|---|---|---|---|---|---|
| | Core | C.I.L.L.* | Core: C.I.L.L.* | Conversion (%) | after Durability Test (%) |
| 7th Pref. Embodiment | $Ba/Al_2O_3$ | $Pt/Al_2O_3$ | 1:1 | 62.3 | 48.6 |
| 8th Pref. Embodiment | $Ba/Al_2O_3$ | $Pt/Al_2O_3$ | 3:1 | 70.9 | 55.6 |
| 9th Pref. Embodiment | $Ba/Al_2O_3$ | $P1,Al_2O_3$ | 5:1 | 66.8 | 52.4 |
| 10th Pref. Embodiment | $K/Al_2O_3$ | $PtlAl_2O_3$ | 3:1 | 75.4 | 58.2 |
| 11th Pref. Embodiment | $Ba/TiO_2$ | $Pt/Al_2O_3$ | 3:1 | 66.3 | 55.6 |
| 12th Pref. Embodiment | $Ba/ZrO_2$ | $Pt/Al_2O_3$ | 3:1 | 65.9 | 52.7 |
| Comp. Ex. No. 2 | Pt & $Ba/Al_2O_3$ | None | None | 64.1 | 32.3 |
| Ref. Ex. No. 1 | $Ba/Al_2O_3$ | $Pt/Al_2O_3$ | 1:3 | 56.5 | 21.5 |
| Ref. Ex. No. 2 | $Ba/Al_2O_3$ | $Pt/Al_2O_3$ | 9:1 | 60.0 | 30.9 |

*Note:
"C.I.L.L." stands for Catalyst Ingredient Loading Layer.

(Evaluation)

Comparative Example No. 2, a conventional exhaust gas purifying catalyst, exhibited a relatively good initial $NO_x$ conversion, but exhibited a sharply deteriorated $NO_x$ purifying after the durability test. Whilst, in the exhaust gas purifying catalysts of the Seventh through Twelfth Preferred Embodiments, the $NO_x$ conversions were found to be degraded less, and were also found to be kept relatively high even after the durability test. This advantage was apparently effected by the arrangement that the $NO_x$ storage member was loaded in the core and the Pt was loaded in the catalyst ingredient loading layer. It is believed that the advantage resulted from the fact that the Pt was inhibited from sintering during the durability test.

On the other hand, the exhaust gas purifying catalyst of Reference Example No. 1 had the same arrangement as that Twelfth Preferred Embodiments because the outermost catalyst ingredient loading layer largely contributes to the advantage.

Thirteenth Preferred Embodiment

Figure 3:
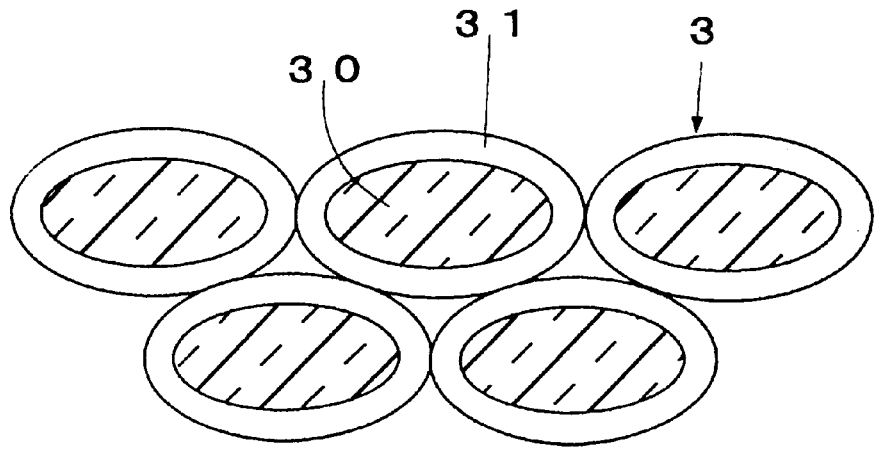
FIG. 3 is a schematic cross-sectional view of an exhaust gas purifying catalyst of a Thirteenth Preferred Embodiment according to the present invention.

FIG. 3 illustrates a cross-sectional view of an exhaust gas purifying catalyst of a Thirteenth Preferred Embodiment according to the present invention. As illustrated in FIG. 3, the exhaust gas purifying catalyst comprises an assembly of a catalyst powder 3. The catalyst powder 3 includes a core 30, and a catalyst ingredient loading layer 31 formed on the core 30. The core 30 is formed of a composite oxide which includes $K_2O$, $TiO_2$ and $Al_2O_3$. The catalyst ingredient loading layer 31 includes alumina which is composited with Pt.

The production process of the exhaust gas purifying catalyst will be hereinafter described instead of the detailed description on the arrangements thereof.

(Core Powder Forming)

A predetermined amount of isopropyl alcohol was put into a container made from stainless steel. Aluminum tri-isopropoxide ($Al(OC_3H_7)_3$) was then charged into the container. Potassium acetate was further charged into the container. Titanium tetra-isopropoxide ($Ti(OC_3H_7)_4$) was furthermore charged into the container. Note that the addition of the aluminum tri-isopropoxide could be converted as 39.9 grams of $Al_2O_3$, the addition of the potassium acetate could be converted as 18.8 grams of $K_2O$, and the addition of the titanium tetra-isopropoxide could be converted as 31.3 grams of $TiO_2$.

The resulting mixture solution was heated to 80° C., was stirred to dissolve, and was hydrolyzed by using a predetermined amount of ion-exchanged water. The resulting hydrolyzed product was subjected to a sol-gel process, drying, pulverizing and firing at 500° C. A core powder was thus prepared. Note that the resulting core powder included a composite oxide which was composed of $K_2O$, $TiO_2$ and $Al_2O_3$ in a ratio of 0.4:1:1 by mole.

(Catalyst Ingredient Loading Layer Forming)

A predetermined amount of isopropyl alcohol was put into another container made from stainless steel. Aluminum tri-isopropoxide ($Al(OC_3H_7)_3$) was then charged into the container. 50 grams of the core powder was further charged into the container. Note that the addition of the aluminum tri-isopropoxide could be converted as 50 grams of $Al_2O_3$.

While stirring, the resulting mixture solution was heated to 80° C. to dissolve the aluminum tri-isopropoxide, and was thereafter hydrolyzed by using an aqueous solution in which a platinum compound (e.g., a platinum ammine hydroxide salt) was dissolved. The concentration of the platinum compound in the aqueous solution could be converted as 1.1 grams of Pt. The resulting hydrolyzed product was subjected to a sol-gel process, drying, pulverizing and firing at 500° C. A catalyst ingredient loading layer was thus formed on the core powder. A catalyst powder of the Thirteenth Preferred Embodiment was thus completed. Note that the catalyst ingredient loading layer included a composite of Pt and $Al_2O_3$ (hereinafter simply referred to as a "Pt-$Al_2O_3$ composite"), and that the resultant catalyst powder included the core and the catalyst ingredient loading layer in a ratio of 1:1 by weight.

(Catalyst Preparation)

The thus prepared catalyst powder was turned into a slurry by an ordinary process, and was coated on a monolithic support by a wash-coating process. The monolithic catalyst support was formed of cordierite, and had a diameter of 30 mm and a length of 50 mm. The monolithic catalyst support was then fired at 500° C. for 1 hour to prepare a monolithic catalyst. Note that the coating amount of the catalyst powder was 180 grams with respect to the unit volume (e.g., 1 liter) of the monolithic catalyst support, and that the loading amount of the Pt was 2 grams with respect to 1 liter of the monolithic catalyst support.

(Examination)

The resulting monolithic catalyst was subjected to a durability test by using a fuel-lean model gas and a fuel-rich model gas whose compositions are recited in Table 5 below. In the durability test, the fuel-lean model gas and fuel-rich model gas were alternately introduced into the monolithic catalyst for 4 hours in total, the fuel-lean model gas was introduced into the monolithic catalyst for 4 minutes, alternately the fuel-rich model gas was introduced into the monolithic catalyst for 1 minute, and the temperature of the fuel-lean model gas and fuel-rich model gas was controlled at 700° C. at the inlet of the monolithic catalyst.

After the durability test, the monolithic catalyst was examined for the $NO_x$ conversion by using another fuel-lean model gas and another fuel-rich model gas whose compositions are also recited in Table 5 below. In the examination of the $NO_x$ conversion, the fuel-lean model gas and fuel-rich model gas was alternately introduced into the monolithic catalyst, the fuel-lean model gas was introduced into the monolithic catalyst for 2 minutes, alternately the fuel-rich model gas was introduced into the monolithic catalyst for 2 minutes, the temperature of the fuel-lean model gas and fuel-rich model gas was controlled at 300° C. at the inlet of the monolithic catalyst, and the $NO_x$ conversion was measured when the fuel-lean model gas was introduced into the monolithic catalyst. The results of the examination are summarized in Table 6 below.

TABLE 5

| | HC (ppmC) | CO (%) | NO (ppm) | $SO_2$ (ppm) | $CO_2$ (%) | $O_2$ (%) | $H_2O$ (%) | $N_2$ |
|---|---|---|---|---|---|---|---|---|
| Fuel-lean Model Gas for Durability Test | 2000 | 0.60 | 500 | 600 | 10.0 | 6.50 | 10.0 | Balance |
| Fuel-rich Model Gas for Durability Test | 2000 | 0.10 | 500 | 600 | 10.0 | 0.40 | 10.0 | Balance |
| Fuel-lean Model Gas for Examination | 2000 | 0.60 | 500 | 0 | 10.0 | 6.50 | 10.0 | Balance |
| Fuel-rich Model Gas for Examination | 2000 | 0.10 | 500 | 0 | 10.0 | 0.40 | 10.0 | Balance |

Fourteenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 51.1 grams of $Al_2O_3$, the addition of the potassium acetate could be converted as 18.8 grams of $K_2O$, and the addition of the titanium tetra-isopropoxide could be converted as 20 grams of $TiO_2$. Note that the resulting core powder included a composite oxide which was composed of K$_2$O, TiO$_2$ and Al$_2$O$_3$ in a ratio of 0.8:1:2 by mole.

Except that the core powder was used, a catalyst ingredient loading layer including a Pt-Al$_2$O$_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the NO$_x$ conversion after the durability test in the identical fashion with the Thirteenth Preferred Embodiment. The results of the examination are summarized in Table 6 below.

Fifteenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of Al$_2$O$_3$, the addition of the potassium acetate could be converted as 18.8 grams of K$_2$O, and the addition of the titanium tetra-isopropoxide could be converted as 11.7 grams of TiO$_2$. Note that the resulting core powder included a composite oxide which was composed of K$_2$O, TiO$_2$ and Al$_2$O$_3$ in a ratio of 1.4:1:4 by mole.

Except that the core powder was used, a catalyst ingredient loading layer including a Pt-Al$_2$O$_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the NO$_x$ conversion after the durability test in the identical fashion with the Thirteenth Preferred Embodiment. The results of the examination are summarized in Table 6 below.

Sixteenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 63 grams of Al$_2$O$_3$, the addition of the potassium acetate could be converted as 18.8 grams of K$_2$O, and the addition of the titanium tetra-isopropoxide could be converted as 8.2 grams of TiO$_2$. Note that the resulting core powder included a composite oxide which was composed of K$_2$O, TiO$_2$ and Al$_2$O$_3$ in a ratio of 2:1:6 by mole.

Except that the core powder was used, a catalyst ingredient loading layer including a Pt-Al$_2$O$_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the NO$_x$ conversion after the durability test in the identical fashion with the Thirteenth Preferred Embodiment. The results of the examination are summarized in Table 6 below.

Seventeenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 65.5 grams of Al$_2$O$_3$, the addition of the potassium acetate could be converted as 13.4 grams of K$_2$O, and the addition of the titanium tetra-isopropoxide could be converted as 5.7 grams of TiO$_2$. Note that the resulting core powder included a composite oxide which was composed of K$_2$O, TiO$_2$ and Al$_2$O$_3$ in a ratio of 2:1:9 by mole.

Except that the core powder was used, a catalyst ingredient loading layer including a Pt-Al$_2$O$_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the NO$_x$ conversion after the durability test in the identical fashion with the Thirteenth Preferred Embodiment. The results of the examination are summarized in Table 6 below.

Eighteenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 66.8 grams of Al$_2$O$_3$, the addition of the potassium acetate could be converted as 10.0 grams of K$_2$O, and the addition of the titanium tetra-isopropoxide could be converted as 4.4 grams of TiO$_2$. Note that the resulting core powder included a composite oxide which was composed of K$_2$O, TiO$_2$ and Al$_2$O$_3$ in a ratio of 2:1:12 by mole.

Except that the core powder was used, a catalyst ingredient loading layer including a Pt-Al$_2$O$_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the NO$_x$ conversion after the durability test in the identical fashion with the Thirteenth Preferred Embodiment. The results of the examination are summarized in Table 6 below.

Nineteenth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

Except that the core powder was used, a catalyst ingredient loading layer including a Pt-$Al_2O_3$ composite was formed in the identical fashion with the Thirteenth Preferred Embodiment. Note that the resultant catalyst powder included the core and the catalyst ingredient loading layer in a ratio of 1:2 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 below.

Twentieth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

Except that the core powder was used, a catalyst ingredient loading layer including a Pt-$Al_2O_3$ composite was formed in the identical fashion with the Thirteenth Preferred Embodiment. Note that the resultant catalyst powder included the core and the catalyst ingredient loading layer in a ratio of 2:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 below.

Twenty-First Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

Except that the core powder was used, a catalyst ingredient loading layer including a Pt-$Al_2O_3$ composite was formed in the identical fashion with the Thirteenth Preferred Embodiment. Note that the resultant catalyst powder included the core and the catalyst ingredient loading layer in a ratio of 3:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 below.

Twenty-Second Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

Except that the core powder was used, a catalyst ingredient loading layer including a Pt-$Al_2O_3$ composite was formed in the identical fashion with the Thirteenth Preferred Embodiment. Note that the resultant catalyst powder included the core and the catalyst ingredient loading layer in a ratio of 5:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 below.

Twenty-Third Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

Except that the core powder was used, a catalyst ingredient loading layer including a Pt-$Al_2O_3$ composite was formed in the identical fashion with the Thirteenth Preferred Embodiment. Note that the resultant catalyst powder included the core and the catalyst ingredient loading layer in a ratio of 7:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 below.

Twenty-Fourth Preferred Embodiment

Except that aluminum tri-isopropoxide and titanium tetra-isopropoxide were charged in isopropyl alcohol in the following amounts, respectively, a powder was prepared in the same manner as the Thirteenth Preferred Embodiment. The addition of the aluminum tri-isopropoxide could be converted as 61.0 grams of $Al_2O_3$, and the addition of the titanium tetra-isopropoxide could be converted as 12.0 grams of $TiO_2$. Note that the resulting powder included a composite oxide which was composed of $TiO_2$ and $Al_2O_3$ in a ratio of 1:4 by mole.

71.2 grams of the powder was charged in an aqueous solution in which 0.2 moles of potassium acetate was dissolved. Then, the resulting mixture was evaporated to dry. A core powder was completed in which K was loaded in an amount of 0.2 moles.

Except that the core powder was used, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Twenty-Fifth Preferred Embodiment

Except that aluminum tri-isopropoxide and potassium acetate were charged in isopropyl alcohol in the following amounts, respectively, a core powder was prepared in the same manner as the Thirteenth Preferred Embodiment. The addition of the aluminum tri-isopropoxide could be converted as 71.2 grams of $Al_2O_3$, and the addition of the potassium acetate could be converted as 10.9 grams of $K_2O$. Note that the resulting core powder included a composite oxide which was composed of $K_2O$ and $Al_2O_3$ in a ratio of 1:6 by mole.

Except that the core powder was used, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Twenty-Sixth Preferred Embodiment

Except that aluminum tri-isopropoxide and barium di-isopropoxide were charged in isopropyl alcohol in the following amounts, respectively, a core powder was prepared in the same manner as the Thirteenth Preferred Embodiment. The addition of the aluminum tri-isopropoxide could be converted as 60 grams of $Al_2O_3$, and the addition of the barium di-isopropoxide could be converted as 30 grams of BaO. Note that the resulting core powder included a composite oxide which was composed of BaO and $Al_2O_3$ in a ratio of 1:3 by mole.

Except that the core powder was used, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Twenty-Seventh Preferred Embodiment

Except that aluminum tri-isopropoxide, barium di-isopropoxide and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 55.2 grams of $Al_2O_3$, the addition of the barium di-isopropoxide could be converted as 27.6 grams of BaO, and the addition of the titanium tetra-isopropoxide could be converted as 7.2 grams of $TiO_2$. Note that the resulting core powder included a composite oxide which was composed of BaO, $TiO_2$ and $Al_2O_3$ in a ratio of 1:0.5:3 by mole.

Except that the core powder was used, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Twenty-Eighth Preferred Embodiment 71.2 grams of a commercially available activated alumina powder was charged in an aqueous solution in which 0.2 moles of potassium acetate was dissolved. The activated alumina powder had an average particle diameter of 10 μm. Then, the resulting mixture was evaporated to dry. A powder was completed in which K was loaded in an amount of 0.2 moles.

Except that the activated alumina powder with K loaded was used as a core powder, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Twenty-Ninth Preferred Embodiment

A commercially available activated alumina powder and a commercially available titania powder were mixed so that the mixing ratio, $TiO_2:Al_2O_3$, was equal to 1:4 by mole. The activated alumina powder had an average particle diameter of 10 $\mu$m. The titania powder had an average particle diameter of 3 $\mu$m. The mixture powder was charged in an aqueous solution in which 0.2 moles of potassium acetate was dissolved. Then, the resulting mixture was evaporated to dry. A mixture powder was completed in which K was loaded in an amount of 0.2 moles.

Except that the mixture powder with K loaded was used as a core powder, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Thirtieth Preferred Embodiment

Except that aluminum tri-isopropoxide, potassium acetate and titanium tetra-isopropoxide were charged in isopropyl alcohol in the following amounts, respectively, a core powder was prepared in the same manner as the Thirteenth Preferred Embodiment. The addition of the aluminum tri-isopropoxide could be converted as 59.5 grams of $Al_2O_3$, the addition of the potassium acetate could be converted as 18.8 grams of $K_2O$, and the addition of the titanium tetra-isopropoxide could be converted as 11.7 grams of $TiO_2$. Note that the resulting core powder included a composite oxide which was composed of $K_2O$, $TiO_2$ and $Al_2O_3$ in a ratio of 1.4:1:4 by mole.

50 grams of the thus prepared core powder was charged in isopropyl alcohol in which aluminum tri-isopropoxide was dissolved in an amount that could be converted as 50 grams of $Al_2O_3$. While stirring, the resulting mixture solution was heated to 80° C., and was hydrolyzed by using ion-exchanged water. The resulting hydrolyzed product was subjected to a sol-gel process, drying, pulverizing and firing at 500° C. A catalyst ingredient loading layer including $Al_2O_3$ was thus formed on the core. Note that the thus processed core powder included the core and the catalyst ingredient loading layer in a ratio of 1:1 by weight.

Finally, the core powder with the catalyst ingredient loading layer formed was immersed into an aqueous solution, in which platinum dinitrodiammine was dissolved in an aqueous nitric acid solution, and was retrieved from the aqueous solution. Thereafter, the core powder was dried and fired to prepare a catalyst powder in which Pt was loaded in an amount of 1.1% by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

Thirty-First Preferred Embodiment 60 grams of a commercially available activated alumina powder was charged in an aqueous solution in which 0.2 moles of barium acetate was dissolved. The activated alumina powder had an average particle diameter of 10 $\mu$m. Then, the resulting mixture was evaporated to dry. A powder was completed in which Ba was loaded in an amount of 0.2 moles.

Except that the activated alumina powder with Ba loaded was used as a core powder, a catalyst ingredient loading layer including a $Pt-Al_2O_3$ composite was formed in the identical fashion with the Thirteenth Preferred Embodiment. Note that the resultant catalyst powder included the core and the catalyst ingredient loading layer in a ratio of 1:1 by weight.

A monolithic catalyst was made from the thus prepared catalyst powder, and was subjected to the durability test in the same manner as the Thirteenth Preferred Embodiment. Moreover, the monolithic catalyst was examined for the $NO_x$ conversion after the durability test in the identical fashion with the Thirteenth Preferred Embodiment. The results of the examination are summarized in Table 6 (bis) below.

TABLE 6

|  | Core Composition | $TiO_2$-to-$Al_2O_3$ Ratio | C.I.L.L.* Composition | Core-to-C.I.L.L.* Ratio | N.C.A.D.T.** (%) |
|---|---|---|---|---|---|
| 13th Pref. Embodiment | $K_2O—TiO_2—Al_2O_3—$ Composite Oxide | 1:1 | $Pt—Al_2O_3$ Composite | 1:1 | 32 |
| 14th Pref. Embodiment | $K_2O—TiO_2—Al_2O_3—$ Composite Oxide | 1:2 | $Pt—Al_2O_3$ Composite | 1:1 | 40.5 |
| 15th Pref. Embodiment | $K_2O—TiO_2—Al_2O_3—$ Composite Oxide | 1:4 | $Pt—Al_2O_3$ Composite | 1:1 | 49.4 |
| 16th Pref. Embodiment | $K_2O—TiO_2—Al_2O_3—$ Composite Oxide | 1:6 | $Pt—Al_2O_3$ Composite | 1:1 | 46.4 |
| 17th Pref. Embodiment | $K_2O—TiO_2—Al_2O_3—$ Composite Oxide | 1:9 | $Pt—Al_2O_3$ Composite | 1:1 | 42.7 |
| 18th Pref. Embodiment | $K_2O—TiO_2—Al_2O_3—$ Composite Oxide | 1:12 | $Pt—Al_2O_3$ Composite | 1:1 | 33.9 |
| 19th Pref. Embodiment | $K_2O—TiO_2—Al_2O_3—$ Composite Oxide | 1:4 | $Pt—Al_2O_3$ Composite | 1:2 | 28.5 |
| 20th Pref. Embodiment | $K_2O—TiO_2—Al_2O_3—$ Composite Oxide | 1:4 | $Pt—Al_2O_3$ Composite | 2:1 | 59.2 |
| 21st Pref. Embodiment | $K_2O—TiO_2—Al_2O_3—$ Composite Oxide | 1:4 | $Pt—Al_2O_3$ Composite | 3:1 | 56.5 |
| 22nd Pref. Embodiment | $K_2O—TiO_2—Al_2O_3—$ Composite Oxide | 1:4 | $Pt—Al_2O_3$ Composite | 5:1 | 41.8 |
| 23rd Pref. | $K_2O—TiO_2—Al_2O_3—$ | 1:4 | $Pt—Al_2O_3$ | 7:1 | 23.6 |

TABLE 6-continued

| | Core Composition | TiO$_2$-to-Al$_2$O$_3$ Ratio | C.I.L.L.* Composition | Core-to-C.I.L.L.* Ratio | N.C.A.D.T.** (%) |
|---|---|---|---|---|---|
| Embodiment | Composite Oxide | | Composite (bis) | | |
| 24th Pref. Embodiment | Loaded K$_2$O & TiO$_2$—Al$_2$O$_3$— Composite Oxide | 1:4 | Pt—Al$_2$O$_3$ Composite | 1:1 | 34.2 |
| 25th Pref. Embodiment | K$_2$O—Al$_2$O$_3$— Composite Oxide | No TiO$_2$ | Pt—Al$_2$O$_3$ Composite | 1:1 | 36.4 |
| 26th Pref. Embodiment | BaO—Al$_2$O$_3$— Composite Oxide | No TiO$_2$ | Pt—Al$_2$O$_3$ Composite | 1:1 | 44.4 |
| 27th Pref. Embodiment | BaO—TiO$_2$—Al$_2$O$_3$— Composite Oxide | 1:6 | Pt—Al$_2$O$_3$ Composite | 1:1 | 42.7 |
| 28th Pref. Embodiment | Loaded K$_2$O & Al$_2$O$_3$ | No TiO$_2$ | Pt—Al$_2$O$_3$ Composite | 1:1 | 22 |
| 29th Pref. Embodiment | Loaded K$_2$O & Mixture of TiO$_2$ & Al$_2$O$_3$ | 1:4 | Pt—Al$_2$O$_3$ Composite | 1:1 | 27.3 |
| 30th Pref. Embodiment | K$_2$O—TiO$_2$—Al$_2$O$_3$— Composite Oxide | 1:4 Al$_2$O$_3$ | Loaded Pt & | 1:1 | 18.1 |
| 31st Pref. Embodiment | Loaded BaO & Al$_2$O$_3$ | No TiO$_2$ | Pt—Al$_2$O$_3$ Composite | 1:1 | 24.6 |

*Note (1):
"C.I.L.L." stands for Catalyst Ingredient Loading Layer.
**Note (2):
"N.C.A.D.T." stands for NO$_x$ Conversion after Durability Test.

(Evaluation)

All of the Thirteenth through Eighteenth Preferred Embodiments employed the core in which the K$_2$O, TiO$_2$ and Al$_2$O$_3$ were composited, and the catalyst ingredient loading layer in which the Al$_2$O$_3$ was composited with the Pt. The durability of the Thirteenth through Eighteenth Preferred Embodiments seems to have something to do with the TiO$_2$/Al$_2$O$_3$ ratio.

For instance, all of the Thirteenth through Eighteenth Preferred Embodiments exhibited a higher NO$_x$ conversion after the durability test than that of the Twenty-eighth Preferred Embodiment which was free from the TiO$_2$. Thus, it is apparent that compositing the TiO$_2$ is effective to improve the NO$_x$ conversion after the durability test. In the Thirteenth Preferred Embodiment, the TiO$_2$/Al$_2$O$_3$ ratio was large. In the Eighteenth Preferred Embodiment, the TiO$_2$/Al$_2$O$_3$ ratio was small. In the Fifteenth and Sixteenth Preferred Embodiments, the TiO$_2$/Al$_2$O$_3$ ratio was 1:4 and 1:6, respectively. The Thirteenth Preferred Embodiment exhibited an NO$_x$ conversion lower after the durability test than the Fifteenth and Sixteenth Preferred Embodiments did. Likewise, the Eighteenth Preferred Embodiment exhibited an NO$_x$ conversion lower after the durability test than the Fifteenth and Sixteenth Preferred Embodiments did. It is believed that the advantage is effected less when the TiO$_2$ is composited less, and that the heat resistance of the core is decreased when the TiO$_2$ is composited too much.

A certain relationship between the core-to-catalyst ingredient loading layer ratio and the durability of the resulting exhaust gas purifying catalyst seems to be derived from the Fifteenth Preferred Embodiment and the Nineteenth through Twenty-third Preferred Embodiments. For example, the Twentieth and Twenty-first Preferred Embodiments had the core-to-catalyst ingredient loading layer ratio of 2:1 and 3:1, respectively, and exhibited the peak NO$_x$ conversion after the durability test. It is thus understood that the core-to-catalyst ingredient loading layer ratio falling in the range can be optimum.

In the Fifteenth Preferred Embodiment and the Nineteenth through Twenty-third Preferred Embodiments, the cores were made by compositing K$_2$O, TiO$_2$ and Al$_2$O$_3$ in the identical ratio. When the core-to-catalyst ingredient loading layer ratio was increased, the NO$_x$ conversion was decreased. As the core-to-catalyst ingredient loading layer ratio was increased, the content of the NO$_x$ storage member (e.g., K) was increased. The decrement of the NO$_x$ conversion is attributed to the sintering of the Pt which is affected by the increment of the content of the NO$_x$ storage member. Moreover, when the core-to-catalyst ingredient loading layer ratio was increased excessively, the loading density of the Pt was increased too high. Accordingly, the Pt was likely to sinter. Thus, the likelihood of the sintering is assumed to be another reason for the decrement of the NO$_x$ conversion. On the other hand, when the core-to-catalyst ingredient loading layer ratio was small, the NO$_x$ conversion was decreased similarly. The durability was believedly degraded not only because the K was insufficient, but also because the catalyst ingredient loading layer was so thick that the Pt was buried in the Al$_2$O$_3$ to decrease its own exposed area.

When the Twenty-fourth Preferred Embodiment is compared with the Twenty-ninth Preferred Embodiment, it is understood that the durability can be furthermore improved by making the TiO$_2$ and Al$_2$O$_3$ into the composite oxide than by physically mixing them. When the Twenty-fifth Preferred Embodiment is compared with the Twenty-eighth Preferred Embodiment, it is appreciated that the durability can be furthermore improved by compositing the K with the core than by loading the K in it. This phenomenon is attributed to the following acts: the K is segregated in the surface of the core when it is loaded; but it is dispersed highly and uniformly in the core when it is composited therewith.

In the Thirtieth Preferred Embodiment, the composition of the core was preferable because the K, working as the NO$_x$ storage member, was composited with the core, but the Pt was loaded on the catalyst ingredient loading layer by adsorption. Accordingly, the Pt was loaded on the surface of the Al$_2$O$_3$ with a high density to reduce the dispersibility. As a result, the Thirtieth Preferred Embodiment exhibited a considerably degraded NO$_x$ conversion after the durability test with respect to that of the Fifteenth Preferred Embodiment whose catalyst ingredient loading layer is formed of the Pt-$Al_2O_3$ composite.

In the Twenty-sixth and Twenty-seventh Preferred Embodiments, the Ba was used as the $NO_x$ storage member. The durability of the Twenty-sixth and Twenty-seventh Preferred Embodiments was enhanced as in the preferred embodiments in which the K was used as the $NO_x$ storage member. When the Ba was used as the $NO_x$ storage member, there was no appreciable difference in terms of the durability whether the core was formed with or without the $TiO_2$. The reason behind the phenomenon is unknown, and is still under investigation.

Thirty-Second Preferred Embodiment

Figure 4:
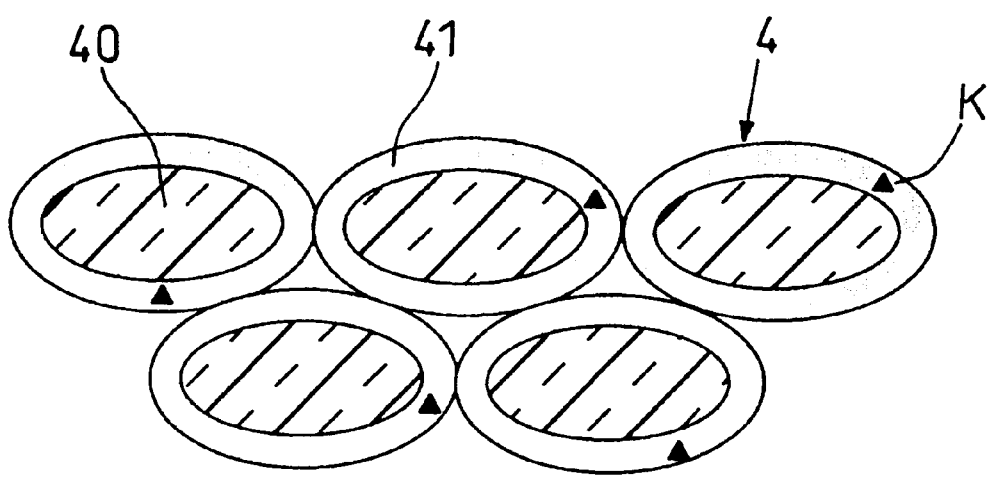
FIG. 4 is a schematic cross-sectional view of an exhaust gas purifying catalyst of a Thirty-second Preferred Embodiment according to the present invention.

FIG. 4 illustrates a cross-sectional view of an exhaust gas purifying catalyst of a Thirty-second Preferred Embodiment according to the present invention. As illustrated in FIG. 4, the exhaust gas purifying catalyst comprises an assembly of a catalyst powder 4. The catalyst powder 4 includes a core 40, and a catalyst ingredient loading layer 41 formed on the core 40. The core 40 is formed of a composite oxide which includes $K_2O$, $TiO_2$ and $Al_2O_3$. The catalyst ingredient loading layer 41 includes alumina which is composited with Pt, and which is further provided with potassium (K) loaded therein.

The production process of the exhaust gas purifying catalyst will be hereinafter described instead of the detailed description on the arrangements thereof.

(Core Powder Forming)

A predetermined amount of isopropyl alcohol was put into a container made from stainless steel. Aluminum tri-isopropoxide ($Al(OC_3H_7)_3$) was then charged into the container. Potassium acetate was further charged into the container. Titanium tetra-isopropoxide ($Ti(OC_3H_7)_4$) was furthermore charged into the container. Note that the addition of the aluminum tri-isopropoxide could be converted as 91.8 grams of $Al_2O_3$, the addition of the potassium acetate could be converted as 18.8 grams of $K_2O$, and the addition of the titanium tetra-isopropoxide could be converted as 8 grams of $TiO_2$.

The resulting mixture solution was heated to 80° C., was stirred to dissolve, and was hydrolyzed by using a predetermined amount of ion-exchanged water. The resulting hydrolyzed product was subjected to a sol-gel process, drying, pulverizing and firing at 500° C. A core powder was thus prepared, and had an average particle diameter of 1.5 μm. Note that the resulting core powder included a composite oxide which was composed of $K_2O$, $TiO_2$ and $Al_2O_3$ in a ratio of 2:1:9 by mole.

(Catalyst Ingredient Loading Layer Forming)

A predetermined amount of isopropyl alcohol was put into another container made from stainless steel. Aluminum tri-isopropoxide ($Al(OC_3H_7)_3$) was then charged into the container. 66.7 grams of the core powder was further charged into the container. Note that the addition of the aluminum tri-isopropoxide could be converted as 33.3 grams of $Al_2O_3$.

While stirring, the resulting mixture solution was heated to 80° C. to dissolve the aluminum tri-isopropoxide, and was thereafter hydrolyzed by using an aqueous solution in which a platinum compound (e.g., a platinum ammine hydroxide salt) was dissolved. The concentration of the platinum compound in the aqueous solution could be converted as 1.1 grams of Pt. The resulting hydrolyzed product was subjected to a sol-gel process, drying, pulverizing and firing at 500° C.

A catalyst ingredient loading layer was thus formed on the core powder. A catalyst powder of the Thirty-second Preferred Embodiment was thus completed. Note that the catalyst ingredient loading layer included a Pt-$Al_2O_3$ composite, and that the resultant catalyst powder included the core and the catalyst ingredient loading layer in a ratio of 2:1 by weight.

(Catalyst Preparation)

The thus prepared catalyst powder was turned into a slurry by an ordinary process, and was coated on a monolithic support by a wash-coating process. The monolithic catalyst support was formed of cordierite, and had a diameter of 30 mm and a length of 50 mm. The monolithic catalyst support was then fired at 500° C. for 2 hours to prepare a monolithic catalyst. Note that the coating amount of the catalyst powder was 180 grams with respect to the unit volume (e.g., 1 liter) of the monolithic catalyst support, and that the loading amount of the Pt was 2 grams with respect to 1 liter of the monolithic catalyst support.

(Extra $NO_x$ Storage Member Loading)

The resultant monolithic catalyst was examined for the adsorption of isopropyl alcohol when it was dry. Note that the adsorption of isopropyl alcohol is equivalent to the adsorption of water. The monolithic catalyst was then immersed into an isopropyl alcohol solution in which potassium acetate was dissolved in a predetermined amount. Moreover, the monolithic catalyst was dried and fired to load potassium (K) in the catalyst ingredient loading layer. Note that the loading amount of the K was 0.01 mole with respect to 180 grams of the catalyst powder.

(Examination)

Except that the thus prepared monolithic catalyst with the K loaded was examined for the initial $NO_x$ conversion by introducing the fuel-lean model gas for examination (See Table 5 above.) thereinto while varying the temperature of the fuel-lean model gas to 200° C., 350° C. and 500° C. at the inlet before it was subjected to the durability test, and that the degraded monolithic catalyst was examined for the $NO_x$ conversion after the durability test while varying the temperature of the fuel-lean model gas for examination to 200° C., 350° C. and 500° C. at the inlet, the monolithic catalyst was evaluated in the same manner as the Thirteenth Preferred Embodiment. The results of the examination are summarized in Table 7 below.

Thirty-Third Preferred Embodiment

The same monolithic catalyst as prepared in the Thirty-second Preferred Embodiment was employed. Except that, in the extra $NO_x$ storage member loading step, an isopropyl alcohol solution whose potassium acetate concentration was 5 times that of the isopropyl alcohol solution used in the Thirty-second Preferred Embodiment was employed to load the K, the monolithic catalyst with the K loaded was completed in the same manner as the Thirty-second Preferred Embodiment. Note that the loading amount of the K was 0.05 moles with respect to 180 grams of the catalyst powder.

The thus prepared monolithic catalyst with the K loaded was subjected to the durability test, and was examined for the initial $NO_x$ conversions and the $NO_x$ conversions after the durability test in the identical fashion with the Thirty-second Preferred Embodiment. The results of the examination are summarized in Table 7 below.

Thirty-Fourth Preferred Embodiment

The same monolithic catalyst as prepared in the Thirty-second Preferred Embodiment was employed. Except that, in the extra $NO_x$ storage member loading step, an isopropyl alcohol solution whose potassium acetate concentration was 10 times that of the isopropyl alcohol solution used in the Thirty-second Preferred Embodiment was employed to load the K, the monolithic catalyst with the K loaded was completed in the same manner as the Thirty-second Preferred Embodiment. Note that the loading amount of the K was 0.1 mole with respect to 180 grams of the catalyst powder.

The thus prepared monolithic catalyst with the K loaded was subjected to the durability test, and was examined for the initial $NO_x$ conversions and the $NO_x$ conversions after the durability test in the identical fashion with the Thirty-second Preferred Embodiment. The results of the examination are summarized in Table 7 below.

Thirty-Fifth Preferred Embodiment

A predetermined amount of isopropyl alcohol was put into a container made from stainless steel. Aluminum tri-isopropoxide ($Al(OC_3H_7)_3$) was then charged into the container. Barium di-isopropoxide ($Ba(OC_3H_7)_2$) was further charged into the container. Note that the addition of the aluminum tri-isopropoxide could be converted as 102 grams of $Al_2O_3$, and the addition of the barium di-isopropoxide could be converted as 51 grams of BaO.

The resulting mixture solution was heated to 80° C., was stirred to dissolve, and was hydrolyzed by using a predetermined amount of ion-exchanged water. The resulting hydrolyzed product was subjected to a sol-gel process, drying, pulverizing and firing at 500° C. A core powder was thus prepared. Note that the resulting core powder included a composite oxide which was composed of BaO and $Al_2O_3$ in a ratio of 1:3 by mole.

The thus prepared core powder was employed to prepare a catalyst powder: namely; a catalyst ingredient loading layer, which was made from a $Pt-Al_2O_3$ composite, was formed on the core powder in the same manner as the catalyst ingredient loading layer forming step of the Thirty-second Preferred Embodiment. The resulting catalyst powder was turned into the monolithic catalyst in the identical fashion with the Thirty-second Preferred Embodiment.

Except that, in the extra $NO_x$ storage member loading step, an isopropyl alcohol solution of barium acetate was used instead of the isopropyl alcohol solution of potassium acetate to load Ba, the monolithic catalyst with the Ba loaded was completed in the same manner as the Thirty-second Preferred Embodiment. Note that the loading amount of the Ba was 0.01 mole with respect to 180 grams of the catalyst powder.

The thus prepared monolithic catalyst with the Ba loaded was subjected to the durability test, and was examined for the initial $NO_x$ conversions and the $NO_x$ conversions after the durability test in the identical fashion with the Thirty-second Preferred Embodiment. The results of the examination are summarized in Table 7 below.

Thirty-Sixth Preferred Embodiment

The same monolithic catalyst as prepared in the Thirty-fifth Preferred Embodiment was employed. Except that, in the extra $NO_x$ storage member loading step, an isopropyl alcohol solution whose barium acetate concentration was 5 times that of the isopropyl alcohol solution used in the Thirty-fifth Preferred Embodiment was employed to load the Ba, the monolithic catalyst with the Ba loaded was completed in the same manner as the Thirty-fifth Preferred Embodiment. Note that the loading amount of the Ba was 0.05 moles with respect to 180 grams of the catalyst powder.

The thus prepared monolithic catalyst with the Ba loaded was subjected to the durability test, and was examined for the initial $NO_x$ conversions and the $NO_x$ conversions after the durability test in the identical fashion with the Thirty-second Preferred Embodiment. The results of the examination are summarized in Table 7 below.

Thirty-Seventh Preferred Embodiment

The same monolithic catalyst as prepared in the Thirty-fifth Preferred Embodiment was employed. Except that, in the extra $NO_x$ storage member loading step, an isopropyl alcohol solution whose barium acetate concentration was 10 times that of the isopropyl alcohol solution used in the Thirty-fifth Preferred Embodiment was employed to load the Ba, the monolithic catalyst with the Ba loaded was completed in the same manner as the Thirty-fifth Preferred Embodiment. Note that the loading amount of the Ba was 0.1 mole with respect to 180 grams of the catalyst powder.

The thus prepared monolithic catalyst with the Ba loaded was subjected to the durability test, and was examined for the initial $NO_x$ conversions and the $NO_x$ conversions after the durability test in the identical fashion with the Thirty-second Preferred Embodiment. The results of the examination are summarized in Table 7 below.

Thirty-Eighth Preferred Embodiment

The same monolithic catalyst as prepared in the Thirty-second Preferred Embodiment was employed. Except that, in the extra $NO_x$ storage member loading step, an isopropyl alcohol solution whose barium acetate concentration was 5 times that of the isopropyl alcohol solution used in the Thirty-fifth Preferred Embodiment was employed to load the Ba, the monolithic catalyst with the Ba loaded was completed in the same manner as the Thirty-fifth Preferred Embodiment. Note that the loading amount of the Ba was 0.05 moles with respect to 180 grams of the catalyst powder.

The thus prepared monolithic catalyst with the Ba loaded was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

Thirty-Ninth Preferred Embodiment

The same monolithic catalyst as prepared in the Thirty-fifth Preferred Embodiment was employed. Except that, in the extra $NO_x$ storage member loading step, an isopropyl alcohol solution whose potassium acetate concentration was 5 times that of the isopropyl alcohol solution used in the Thirty-second Preferred Embodiment was employed to load the K, the monolithic catalyst with the K loaded was completed in the same manner as the Thirty-second Preferred Embodiment. Note that the loading amount of the K was 0.05 moles with respect to 180 grams of the catalyst powder.

The thus prepared monolithic catalyst with the K loaded was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

Reference Example No. 3

The same monolithic catalyst as prepared in the Thirty-second Preferred Embodiment was employed as the monolithic catalyst without caring out the extra $NO_x$ storage member loading step.

The resulting monolithic catalyst was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

Reference Example No. 4

The same monolithic catalyst as prepared in the Thirty-fifth Preferred Embodiment was employed as the monolithic catalyst without caring out the extra $NO_x$ storage member loading step.

The resulting monolithic catalyst was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

Fortieth Preferred Embodiment

The same monolithic catalyst as prepared in the Thirty-second Preferred Embodiment was employed. Except that, in the extra $NO_x$ storage member loading step, an isopropyl alcohol solution whose potassium acetate concentration was 0.5 times that of the isopropyl alcohol solution used in the Thirty-second Preferred Embodiment was employed to load the K, the monolithic catalyst with the K loaded was completed in the same manner as the Thirty-second Preferred Embodiment. Note that the loading amount of the K was 0.005 moles with respect to 180 grams of the catalyst powder.

The thus prepared monolithic catalyst with the K loaded was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

Forty-First Preferred Embodiment

The same monolithic catalyst as prepared in the Thirty-second Preferred Embodiment was employed. Except that, in the extra $NO_x$ storage member loading step, an isopropyl alcohol solution whose potassium acetate concentration was 15 times that of the isopropyl alcohol solution used in the Thirty-second Preferred Embodiment was employed to load the K, the monolithic catalyst with the K loaded was completed in the same manner as the Thirty-second Preferred Embodiment. Note that the loading amount of the K was 0.15 moles with respect to 180 grams of the catalyst powder.

The thus prepared monolithic catalyst with the K loaded was subjected to the durability test, and was examined for the initial $NO_x$ conversions and the $NO_x$ conversions after the durability test in the identical fashion with the Thirty-second Preferred Embodiment. The results of the examination are summarized in Table 7 (bis) below.

TABLE 7

| | | C.I.L.* | | $NO_x$ Conversion at 200° C. | | $NO_x$ Conversion at 350° C. | | $NO_x$ Conversion at 500° C. | |
|---|---|---|---|---|---|---|---|---|---|
| | Core Composition | Composition | Loading Amount of $NO_x$ Storage Member (mole) | Initial (%) | A.D.T.** (%) | Initial (%) | A.D.T.** (%) | Initial (%) | A.D.T.** (%) |
| 32nd Pref. Embodiment | $2K_2O-TiO_2-6Al_2O_3$ | $Pt-Al_2O_3$ | K (0.01) | 30.7 | 21.1 | 79.5 | 48.9 | 36 | 14.4 |
| 33rd Pref. Embodiment | $2K_2O-TiO_2-6Al_2O_3$ | $Pt-Al_2O_3$ | K (0.05) | 22.4 | 20.1 | 88.4 | 58 | 45.2 | 19.6 |
| 34th Pref. Embodiment | $2K_2O-TiO_2-6Al_2O_3$ | $Pt-Al_2O_3$ | K (0.1) | 19.9 | 21.6 | 92.6 | 59.5 | 63.1 | 24.5 |
| 35th Pref. Embodiment | $BaO-3Al_2O_3$ | $Pt-Al_2O_3$ | Ba (0.01) | 62 | 23.8 | 69.8 | 50.6 | 13.6 | 8.3 |
| 36th Pref. Embodiment | $BaO-3Al_2O_3$ | $Pt-Al_2O_3$ | Ba (0.05) | 68.6 | 33.3 | 84.5 | 53.1 | 14.5 | 2 |
| 37th Pref; Embodiment | $BaO-3Al_2O_3$ | $Pt-Al_2O_3$ | Ba (0.1) | 66.4 | 32.7 | 89.8 | 56.4 | 17.9 | 8.6 |
| | | | (bis) | | | | | | |
| 38th Pref. Embodiment | $2K_2O-TiO_2-6Al_2O_3$ | $Pt-Al_2O_3$ | Ba (0.05) | 45.8 | 33.9 | 87.7 | 60 | 34.6 | 15.3 |
| 39th Pref. Embodiment | $BaO-3Al_2O_3$ | $Pt-Al_2O_3$ | K (0.05) | 51.1 | 19.7 | 84.2 | 56.5 | 24.1 | 17.9 |
| Reference Ex. No. 3 | $2K_2O-TiO_2-6Al_2O_3$ | $Pt-Al_2O_3$ | None | 29.4 | 20.3 | 71.8 | 45.7 | 18.4 | 9.2 |
| Reference Ex. No. 4 | $BaO-3Al_2O_3$ | $Pt-Al_2O_3$ | None | 57.6 | 17.5 | 62.3 | 43.6 | 12.2 | 2.3 |
| 40th Pref. Embodiment | $2K_2O-TiO_2-6Al_2O_3$ | $Pt-Al_2O_3$ | K (0.005) | 29.8 | 21.1 | 70.6 | 46.6 | 19 | 8.9 |
| 41st Pref. Embodiment | $2K_2O-TiO_2-6Al_2O_3$ | $Pt-Al_2O_3$ | K (0.i5) | 4.8 | 7 | 90.3 | 45.9 | 68.6 | 21 |

*Note (1):
"C.I.L.L." stands for Catalyst Ingredient Loading Layer.
**Note (2):
"A.D.T." stands for After Durability Test.

(Evaluation)

Looking at the results of Reference Example Nos. 3 and 4, Reference Example Nos. 3 and 4 were found to exhibit relatively small performance deterioration which resulted from the durability test, but to exhibit low initial $NO_x$ conversions, respectively. The shortcoming is assumed that the $NO_2$ generated in the catalyst ingredient loading layer could not reach the $NO_x$ storage member with a sufficient rate because the $NO_x$ storage member was present only in the core.

On the other hand, in the Thirty-second through Thirty-seventh Preferred Embodiment, the $NO_x$ storage members were also included in the catalyst ingredient loading layer in a small amount, respectively. With this arrangement, the initial performance was improved apparently, and the performance was enhanced in accordance with the improved initial performance even after the durability test. For example, in the Thirty-second through Thirty-fourth Preferred Embodiments, the $NO_x$ conversions at 350° C. and 500° C. were upgraded initially as well as after the durability test with respect to those of Reference Example No. 3. In the Thirty-fifth through Thirty-seventh Preferred Embodiments, the $NO_x$ conversions were improved especially in a low temperature range with respect to those of Reference Example No. 4.

Note that, in the Fortieth Preferred Embodiment, the K was present in the catalyst ingredient loading layer in such a trace amount that there was no appreciable purifying performance difference between the Fortieth Preferred Embodiment and Reference Example No. 3. Note also that, in the Forty-first Preferred Embodiment, the K was present in the catalyst ingredient loading layer in a large amount so that the $NO_x$ conversions were sharply degraded in a low temperature range.

It is understood from Table 7 that the alkali metal (e.g., K) is good in terms of the $NO_x$ storage characteristic on a high temperature side, and that the alkaline-earth metal (e.g., Ba) is good in terms of the $NO_x$ storage characteristic on a low temperature side. Therefore, when the alkali metal and the alkaline-earth metal are varied properly in the core and the catalyst ingredient loading layer as in the Thirty-eighth and Thirty-ninth Preferred Embodiments, the inherent characteristics of the alkali metal and alkaline-earth metal can be effected to widen the temperature window where the $NO_x$ can be purified efficiently.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying an exhaust gas, comprising:
a core including a first support and an $NO_x$ storage member the core having a surface; and
a catalyst ingredient loading layer formed on the whole surface of said core, said catalyst ingredient loading layer including a second support and a noble metal catalyst ingredient;
wherein said $NO_x$ storage member included in said core is substantially free of said noble metal catalyst ingredient.

2. The catalyst according to claim 1, wherein a composition ratio of said core with respect to said catalyst ingredient loading layer is in a range of from 1:2 to 8:1 by weight.

3. The catalyst according to claim 1, wherein said $NO_x$ storage member is at least one element selected from the group consisting of alkali metals and alkaline-earth metals.

4. The catalyst according to claim 1, wherein said second support is a metallic oxide including alumina.

5. The catalyst according to claim 1, wherein said first support includes a composite oxide composed of alumina ($Al_2O_3$) and titania ($TiO_2$); and
a composition ratio of $TiO_2$ with respect to $Al_2O_3$ is in a range of from 1:2 to 1:9 by mole in the composite oxide.

6. The catalyst according to claim 1, wherein said noble metal catalyst ingredient is dispersed in with said second support.

7. The catalyst according to claim 1, wherein part of said $NO_x$ storage member is included in said core and in said catalyst ingredient loading layer.

8. The catalyst according to claim 7, wherein said $NO_x$ storage member is included in said catalyst ingredient loading layer in an amount of from 0.01 to 0.1 mole with respect to 180 grams of said catalyst.

9. The catalyst according to claim 1, wherein said $NO_x$ storage member in said first support is at least one element selected from the group consisting of alkali metals; and
said catalyst ingredient loading layer further includes a $NO_x$ storage member selected from the group consisting of alkaline-earth metals.

10. The catalyst according to claim 1, wherein said $NO_x$ storage member in said first support is at least one element selected from the group consisting of alkaline-earth metals; and
said catalyst ingredient loading layer further includes a $NO_x$ storage member selected from the group consisting of alkali metals.

11. The catalyst according to claim 1, wherein said core comprises a composite oxide of said first support and said $NO_x$ storage member.

12. The catalyst according to claim 1, wherein said core includes said $NO_x$ storage member in an amount of from 0.05 to 10 moles with respect to 1 mole of said first support.

13. The catalyst according to claim 1, wherein said core has an average particle diameter of from 0.1 to 10 μm.

14. The catalyst according to claim 1, wherein said first support is at least one member selected from the group consisting of alumina, titania, zirconia, silica, silica-alumina, silica-titania and zeolite.

15. The catalyst according to claim 1, wherein said second support is at least one member selected from the group consisting of alumina, titania, zirconia, silica, silica-alumina, silica-titania and zeolite.

16. The catalyst according to claim 1, wherein said catalyst ingredient loading layer includes alumina, and at least one oxide selected from the group consisting of titania and zirconia; and
the oxide is included in an amount of from 0.01 to 70% by weight in said catalyst ingredient loading layer.

17. The catalyst according to claim 1, wherein said catalyst ingredient loading layer further includes a transition metal; and
the transition metal is included in an amount of from 1 to 50% by weight in said catalyst ingredient loading layer.

18. The catalyst according to claim 1, wherein said noble metal catalyst ingredient is at least one member selected from the group consisting of platinum (Pt), rhodium (Rh), palladium (Pd), silver (Ag), gold (Au) and iridium (Ir), and said noble metal catalyst ingredient is included in said catalyst ingredient loading layer in an amount of from 0.5 to 20% by weight of said catalyst ingredient loading layer.

19. The catalyst according to claim 1, wherein said catalyst ingredient loading layer has a thickness of from $\frac{1}{100}$ to $\frac{1}{2}$ of an average particle diameter of said core.

20. A process for producing a catalyst for purifying an exhaust gas, the process comprising the steps of:

forming a core powder by mixing a salt of an $NO_x$ storage member with a first alkoxide so as to form a first solution, the $NO_x$ storage member being at least one element selected from the group consisting of alkali metals and alkaline-earth metals, the first alkoxide including a first metal, and hydrolyzing the resulting solution and firing the resulting hydrolyzed product, thereby forming the core powder including a composite oxide of the $NO_x$ storage member and the first metal; and forming a catalyst ingredient loading layer on the core powder by mixing the core powder with a second solution, the second solution including a second alkoxide and ions of a noble metal, the second alkoxide including a second metal, and hydrolyzing the resultant mixture and firing the resulting hydrolyzed product, thereby forming the catalyst ingredient loading layer including the noble metal and the second metal on the core powder;

wherein the $NO_x$ storage member included in the core powder is substantially free of the noble metal.

21. The process according to claim 20, wherein said forming of the catalyst ingredient loading layer comprises adding an aqueous solution including the ions of the noble metal to the second solution including the core powder and the second alkoxide, and hydrolyzing the resultant mixture.

22. The process according to claim 20, wherein said first metal is at least one member selected from the group consisting of aluminum (Al), titanium (Ti), silicon (Si) and zirconium (Zr).

23. The process according to claim 20, wherein said second metal is at least one member selected from the group consisting of aluminum (Al), titanium (Ti), silicon (Si) and zirconium (Zr).

24. The process according to claim 20, wherein said noble metal is at least one member selected from the group consisting of platinum (Pt), rhodium (Rh), palladium (Pd), silver (Ag), gold (Au) and iridium (Ir).

25. The process according to claim 20, wherein said first alkoxide includes a branched alkoxide group.

26. The process according to claim 20, wherein said second alkoxide includes a branched alkoxide group.

27. A catalyst for purifying an exhaust gas, comprising:

a core consisting essentially of a first support and an $NO_x$ storage member; and a catalyst ingredient loading layer formed on the core, the catalyst ingredient loading layer including a second support and a noble metal catalyst ingredient.

28. A catalyst for purifying an exhaust gas, comprising:

a core consisting essentially of a first support and a first $NO_x$ storage member, the core having a surface; and a catalyst ingredient loading layer formed on the core, the catalyst ingredient loading layer including a second support, a noble metal catalyst ingredient and a second $NO_x$ storage member;

wherein the first $NO_x$ storage member included in the core is substantially free of the noble metal catalyst ingredient;

wherein the second $NO_x$ storage member is disposed only in the vicinity of the core such that the second $NO_x$ storage member is separated from the noble metal catalyst ingredient in the catalyst ingredient loading layer.

* * * * *